United States Patent
Sumitani et al.

(10) Patent No.: US 9,876,977 B2
(45) Date of Patent: Jan. 23, 2018

(54) SOLID-STATE IMAGING DEVICE

(71) Applicant: Panasonic Intellectual Property Management Co., Ltd., Osaka (JP)

(72) Inventors: Norihiko Sumitani, Osaka (JP); Hidenari Kanehara, Kyoto (JP); Takayuki Nishitani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 15/196,042

(22) Filed: Jun. 29, 2016

(65) Prior Publication Data

US 2016/0309107 A1 Oct. 20, 2016

Related U.S. Application Data

(63) Continuation of application No. PCT/JP2015/000006, filed on Jan. 5, 2015.

(30) Foreign Application Priority Data

Jan. 22, 2014 (JP) ................. 2014-009756

(51) Int. Cl.
*H04N 5/378* (2011.01)
*H04N 5/374* (2011.01)

(52) U.S. Cl.
CPC ............ *H04N 5/378* (2013.01); *H04N 5/374* (2013.01); *H04N 5/3742* (2013.01)

(58) Field of Classification Search
CPC ....... H04N 5/374; H04N 5/3742; H04N 5/378
See application file for complete search history.

(56) References Cited

U.S. PATENT DOCUMENTS 9,609,213 B2 * 3/2017 Wakabayashi ..... H04N 5/23241
2008/0024635 A1 * 1/2008 Liu .......................... H04N 5/32
348/308

(Continued)

FOREIGN PATENT DOCUMENTS

JP 2000-207886 7/2000
JP 2011-019136 1/2011

(Continued)

OTHER PUBLICATIONS

International Search Report of PCT application No. PCT/JP2015/000006 dated Mar. 10, 2015.

*Primary Examiner* — Amy Hsu
(74) *Attorney, Agent, or Firm* — McDermott Will & Emery LLP

(57) ABSTRACT

A solid-state imaging device includes a plurality of pixels arrayed in a matrix, a plurality of first latch circuits, a first read bit line, a plurality of first driver circuits, a first amplifier, a second latch circuit, a second driver circuit, and a column scanning circuit. Each of the plurality of first latch circuits holds first pixel data which is obtained from a pixel located on the corresponding unit column. Each of the plurality of first driver circuits outputs the first pixel data, which is held in a corresponding one of the first latch circuits, to the first read bit line. The first amplifier amplifies a voltage of the first read bit line to generate first data. The second latch circuit holds the first data. The column scanning circuit sequentially outputs a plurality of the first pixel data by sequentially selecting the plurality of first driver circuits and selecting the second driver circuit. The second driver circuit outputs the first data to a read bit line different from the first read bit line.

13 Claims, 23 Drawing Sheets

(56) References Cited

U.S. PATENT DOCUMENTS

| | | | | |
|---|---|---|---|---|
| 2010/0265374 A1* | 10/2010 | Nishi | ............... | H03M 1/0678 |
| | | | | 348/302 |
| 2011/0007199 A1* | 1/2011 | Heim | ............... | H04N 5/35509 |
| | | | | 348/302 |
| 2011/0080507 A1* | 4/2011 | Iwasa | ............... | H04N 5/378 |
| | | | | 348/302 |
| 2012/0019680 A1* | 1/2012 | Shimada | ............... | H04N 5/2254 |
| | | | | 348/208.99 |
| 2013/0161488 A1* | 6/2013 | Doi | ............... | H04N 5/378 |
| | | | | 250/208.1 |
| 2013/0229555 A1* | 9/2013 | Hashimoto | ............... | H04N 5/378 |
| | | | | 348/300 |
| 2014/0293102 A1* | 10/2014 | Vogelsang | ............... | H04N 5/3535 |
| | | | | 348/294 |

FOREIGN PATENT DOCUMENTS

| | | |
|---|---|---|
| JP | 2011-171889 | 9/2011 |
| JP | 2012-060334 | 3/2012 |

\* cited by examiner

SOLID-STATE IMAGING DEVICE

RELATED APPLICATIONS

This application is a Continuation of International Application No. PCT/JP2015/000006, filed on Jan. 5, 2015, which in turn claims priority from Japanese Patent Application No. 2014-009756, filed on Jan. 22, 2014, the contents of all of which are incorporated herein by reference in their entireties.

BACKGROUND

1. Technical Field

The present disclosure relates to a solid-state imaging device.

2. Description of the Related Art

Recently, as well as a CCD (Charge Coupled Device) type sensor (hereinafter referred to as a "CCD sensor") which has predominated in image sensors, a MOS type image sensor (hereinafter referred to as a "MOS sensor") utilizing a standard process used for a logic LSI has widely been on the market. Different from a CCD sensor, a MOS sensor has characteristics such that various analog circuits and digital circuits can be integrated on a substrate on which an imaging region is formed.

Further, a CCD sensor cannot obtain a digital output until an independent chip having an A/D conversion function, such as an analog front-end processor (hereinafter referred to as AFE) specializing in an analog signal amplification function and an A/D conversion function or a digital signal processor (hereinafter referred to as DSP) having a function of AFE, is connected to the imaging region. On the other hand, a MOS sensor in which an imaging region and an A/D conversion circuit are integrated on the same chip has been commercialized.

A lot of architectures have been proposed for an A/D conversion circuit mounted to a MOS sensor. At present, an image sensor using column A/D conversion for performing simultaneous parallel A/D conversion to image data for one line has predominated.

A column A/D conversion circuit includes a latch circuit and a driver circuit provided for each pixel (each column). The latch circuit temporarily holds pixel data obtained through A/D conversion. The driver circuit outputs this pixel data to a pair of read bit lines A column scanning unit sequentially activates a plurality of driver circuits, thereby outputting a signal corresponding to the pixel data to the pair of read bit lines. A sense amplifier amplifies the signal output to the pair of read bit lines. A flip-flop holds this signal.

On the other hand, Unexamined Japanese Patent Publication No. 2000-207886 proposes a configuration of a data transfer circuit illustrated in FIG. 17.

This data transfer circuit includes a plurality of sub memory cell blocks 6. Each memory cell block 6 includes memory cells MC11, MC12, and MC1$m$ which include a driver and a latch circuit for driving bit lines BL1 and XBL1, and a sub-read circuit.

With this configuration, the parasitic resistance and parasitic capacitance of the bit lines BL1 and XBL1 driven by the drivers can be reduced, whereby the data of memory cells MC11, MC12, and MC1$m$ can be transmitted to the sub-read circuit at high speed.

SUMMARY

A solid-state imaging device according to one aspect of the present disclosure includes: a plurality of pixels arrayed in a matrix; a plurality of first latch circuits, each of which is provided so as to correspond to a different one of a plurality of first unit columns and holds first pixel data obtained by converting an analog signal into a digital signal, the analog signal being generated from a pixel located on a corresponding one of the first unit columns out of the plurality of pixels; a first read bit line; a plurality of first driver circuits, each of which is provided so as to correspond to a different one of the plurality of first unit columns and outputs the first pixel data to the first read bit line, the first pixel data being held in a corresponding one of the first latch circuits; a first amplifier that amplifies a voltage of the first read bit line to generate first data; a second latch circuit that holds the first data; a second driver circuit; and a column scanning circuit. The column scanning circuit sequentially outputs a plurality of the first pixel data corresponding to the plurality of first unit columns by sequentially selecting the plurality of first driver circuits and selecting the second driver circuit, and the second driver circuit outputs the first data held in the second latch circuit to a read bit line different from the first read bit line. In addition, the solid-state imaging device may include: a plurality of third latch circuits, each of which is provided so as to correspond to a different one of a plurality of second unit columns different from the plurality of first unit columns, and holds second pixel data obtained by converting an analog signal into a digital signal, the analog signal being generated from a pixel located on a corresponding one of the second unit columns out of the plurality of pixels; a second read bit line; and a plurality of third driver circuits, each of which is provided so as to correspond to a different one of the plurality of second unit columns and outputs the second pixel data to the second read bit line, the second pixel data being held in a corresponding one of the third latch circuits. In this case, the second driver circuit outputs the first data to the second read bit line. In addition, the solid-state imaging device may include a second amplifier that amplifies a voltage of the second read bit line to generate second data; and an output driver that outputs the second data. In this case, the column scanning circuit sequentially outputs a plurality of the second pixel data corresponding to the plurality of second unit columns to the second amplifier by sequentially selecting the plurality of third driver circuits. In addition, the column scanning circuit may sequentially output the first pixel data to the second amplifier.

With this configuration, two read bit lines are used in the solid-state imaging device. Thus, compared to the case where a single read bit line is used, a load (resistance and capacitance component) of each read bit line can be reduced, whereby a signal can be transmitted at high speed through the read bit line. Thus, a reading speed can be increased.

For example, the first amplifier may be activated only in a cycle in which any one of the plurality of first driver circuits is activated.

With this configuration, the first amplifier is activated only in a necessary period, whereby power consumption is reduced.

For example, the second latch circuit may be further provided so as to correspond to a third unit column, and hold third pixel data obtained by converting an analog signal into a digital signal, the analog signal being generated from a pixel located on the third unit column out of the plurality of pixels, the second driver circuit may output the third pixel data held in the second latch circuit to the second read bit line, and the column scanning circuit may sequentially output a plurality of the second pixel data and the third pixel data corresponding to the plurality of second unit columns and the third unit column to the second amplifier through the second read bit line by sequentially selecting the plurality of third driver circuits and the second driver circuit.

With this configuration, a reading control using two read bit lines can be implemented by using the same number of latch circuits as the number of the unit columns, whereby a chip area can be reduced.

For example, the solid-state imaging device may include m (m is an integer equal to or larger than two) segments associated with different unit column groups, wherein each of the m segments may include the plurality of third latch circuits, the plurality of third driver circuits, the second read bit line, the second latch circuit, the second driver circuit, and the second amplifier, the second latch circuit included in a (j−1)-th (j is an arbitrary integer from two to m) segment of the m segments may hold the second data generated by the second amplifier included in a j-th segment of the m segments, the second latch circuit included in a m-th segment of the m segments may hold the first data generated by the first amplifier, the output driver may output the second data generated by the second amplifier included in a 1st segment of the m segments, and the column scanning circuit (1) may sequentially output the plurality of second pixel data corresponding to a 1st unit column group of the unit column groups to the second amplifier included in the 1st segment through the second read bit line included in the a 1st segment by sequentially selecting the plurality of third driver circuits included in the 1st segment, (2) may sequentially output the plurality of second pixel data corresponding to a j-th unit column group of the unit column groups to the second amplifier included in the 1st segment through a plurality of the second read bit lines included in segments from the j-th segment to the 1st segments by sequentially selecting the plurality of third driver circuits included in the j-th segment and selecting the second driver circuits included in segments from the first segment to (j−1)-th segment, and (3) may sequentially output a plurality of the first pixel data corresponding to the plurality of first unit columns to the second amplifier included in the 1st segment through the first read bit line and a plurality of the second read bit lines included in segments from the m-th segment to the 1st segment by sequentially selecting the plurality of first driver circuits and selecting a plurality of the second driver circuits included in segments from the 1st segment to m-th segment.

With this configuration, three or more read bit lines are used in the solid-state imaging device. Thus, a reading speed can be increased.

For example, the second amplifier included in the j-th segment may be activated only in a cycle in which any one of the plurality of third driver circuits and the second driver circuit included in the j-th segment is activated, and the first amplifier may be activated only in a cycle in which any one of the plurality of first driver circuits is activated.

With this configuration, the second amplifier and the first amplifier are activated only in a necessary period, whereby power consumption is reduced.

For example, the second latch circuit included in each segment may be further provided so as to correspond to a third unit column included in a corresponding one of the unit column groups, and hold third pixel data obtained by converting an analog signal into a digital signal, the analog signal being generated from a pixel located on the third unit column out of the plurality of pixels; the second driver circuit may output the third pixel data held in the second latch circuit to the second read bit line; and the column scanning circuit (1) may sequentially output the plurality of second pixel data corresponding to the 1st unit column group to the second amplifier included in the 1st segment through the second read bit line included in the 1st segment by sequentially selecting the plurality of third driver circuits and the second driver circuit included in the 1st segment, and (2) may sequentially output the plurality of second pixel data corresponding to the j-th unit column group to the second amplifier included in the 1st segment through a plurality of the second read bit lines included in segments from the j-th segment to the 1st segment by sequentially selecting the plurality of third driver circuits and the second driver circuit included in the j-th segment and selecting the second driver circuits included in segments from the 1st segment to the (j−1)-th segment.

With this configuration, a reading control using three or more read bit lines can be implemented by using the same number of latch circuits as the number of the unit columns, whereby a chip area can be reduced.

For example, the column scanning circuit may sequentially output the plurality of second pixel data and the plurality of first pixel data to the second amplifier in order from the pixel data of a unit column closer to the output driver to the pixel data of a unit column away from the output driver by sequentially selecting the plurality of third driver circuits and the plurality of first driver circuits in a forward direction, and the solid-state imaging device may further include an inversion column scanning circuit that sequentially outputs the plurality of second pixel data and the plurality of first pixel data to the second amplifier in order from the pixel data of a unit column away from the output driver to the pixel data of a unit column close to the output driver by sequentially selecting the plurality of third driver circuits and the plurality of first driver circuits in an opposite direction to the forward direction.

With this configuration, the solid-state imaging device can scan the plurality of unit columns both in the forward direction and in the opposite direction.

For example, the plurality of third driver circuits, the plurality of first driver circuits, and the second driver circuit may be disposed at a pitch equal to a pitch of the first unit columns and a pitch of the second unit columns, and the first amplifier may be disposed in a region between a region where the plurality of third driver circuits are disposed and a region where the plurality of first driver circuits are disposed.

With this configuration, the plurality of third driver circuits, the plurality of first driver circuits, and the second driver circuit are disposed at equal pitches. Thus, characteristic variation of each driver circuit caused by non-uniformity of a layout can be reduced.

For example, the solid-state imaging device may include: a first circuit group; and a second circuit group, wherein each of the first circuit group and the second circuit group may include the plurality of third latch circuits, the plurality of third driver circuits, the second read bit line, the second amplifier, the plurality of first latch circuits, the first read bit line, the plurality of first driver circuits, the first amplifier, the second latch circuit, and the second driver circuit, the plurality of second unit columns and first unit columns corresponding to the first circuit group may be a plurality of fourth unit columns disposed at an interval of N (N is an integer equal to or larger than two) unit columns, the plurality of second unit columns and first unit columns corresponding to the second circuit group may be fifth unit columns which are disposed at the interval of the N unit columns, the fifth unit columns being different from the plurality of fourth unit columns, the first circuit group and the second circuit group may be aligned in a direction orthogonal to an arrangement direction of columns, and in each of the first circuit group and the second circuit group, (1) the plurality of third driver circuits, the plurality of first driver circuits, and the second driver circuit may be disposed at a pitch N times the pitch of unit columns, and (2) the first amplifier may be disposed in a region between a region where the plurality of third driver circuits are disposed and a region where the plurality of first driver circuits are disposed.

With this configuration, even if the width of the layout of each driver circuit is wider than the width of the layout of the pixel on the unit column, the plurality of third driver circuits, the plurality of first driver circuits, and the second driver circuit are disposed at equal pitches. Thus, characteristic variation of each driver circuit caused by non-uniformity of a layout can be reduced. Further, parallel reading of pixel data can be enabled.

For example, the solid-state imaging device may further include: one or more first precharge circuits that are connected to the second read bit line and disposed between two adjacent ones of the third driver circuits or between the third driver circuit and the second driver circuit which are adjacent to each other; and one or more second precharge circuits that are connected to the first read bit line and disposed between two adjacent ones of the first driver circuits or between the first driver circuit and the second driver circuit which are adjacent to each other.

With this configuration, even if the precharge circuit is used, the plurality of third driver circuits, the plurality of first driver circuits, and the second driver circuit are disposed at equal pitches. Thus, characteristic variation of each driver circuit caused by non-uniformity of a layout can be reduced.

It should be noted that these comprehensive and specific aspects may be implemented by a system, a method, an integrated circuit, a computer program, or a computer-readable recording medium such as a CD-ROM, or may be implemented by any combinations of a system, a method, an integrated circuit, a computer program, or a recording medium.

The present disclosure can provide a solid-state imaging device that can enhance a reading speed.

DETAILED DESCRIPTION OF EMBODIMENT

Figure 1A:
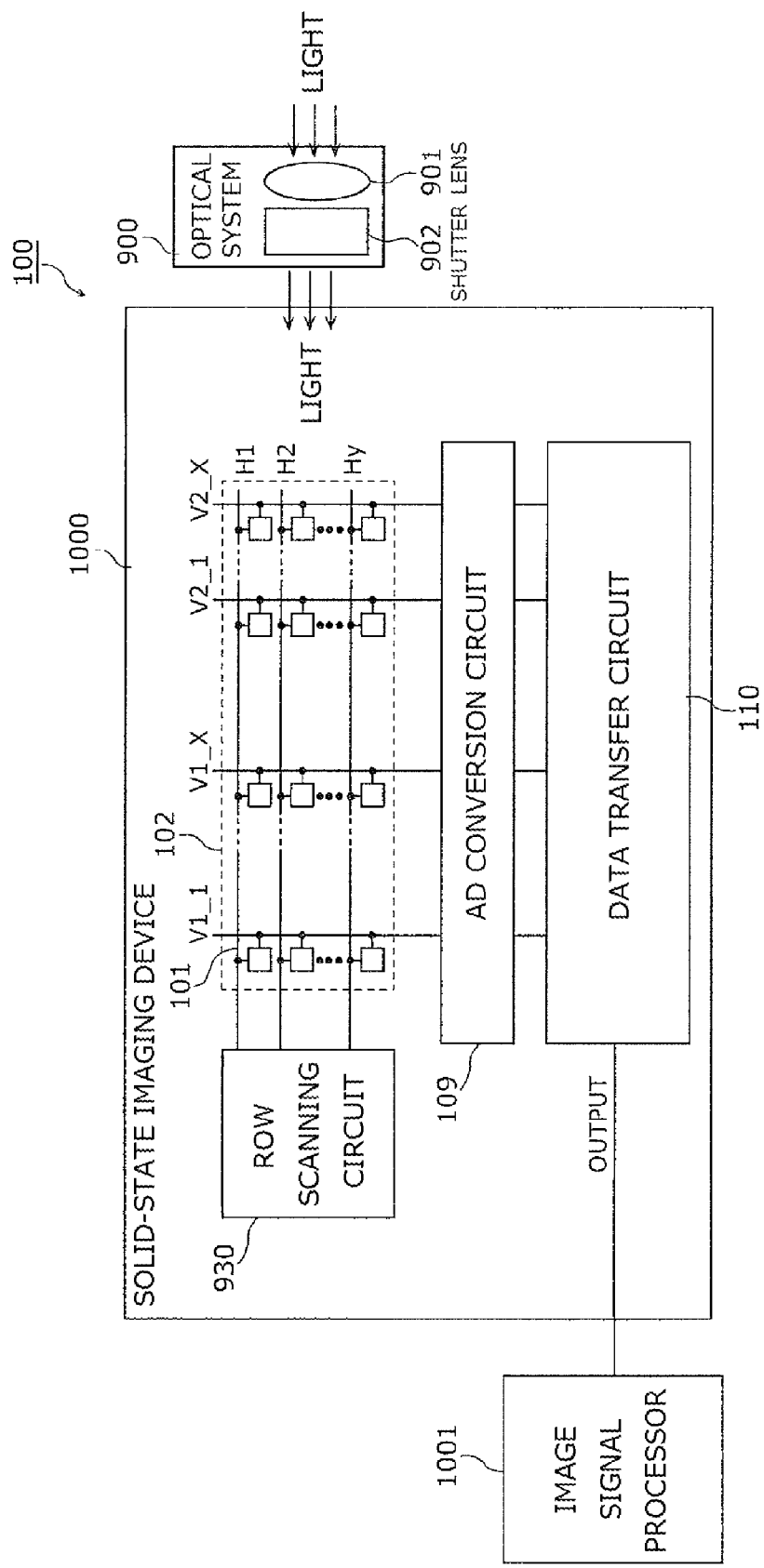
FIG. 1A is a block diagram illustrating a configuration of an imaging device according to a first exemplary embodiment.

Firstly, the problem of the conventional technique will be described. In the above conventional A/D conversion circuit, column A/D conversion circuits are disposed so as to correspond to pixel columns, and therefore, they are disposed throughout a wide range corresponding to the width of the imaging region. Therefore, when an optical size of an imaging device is large, a pair of read bit lines are inevitably wired over a long distance.

The time from the activation of the driver until the sense amplifier can detect pixel data greatly depends on the parasitic resistance and parasitic capacitance of the pair of read bit lines. Therefore, in the case where a pair of long read bit lines is used, it takes much time to transmit signals, entailing deterioration in a reading frequency.

Recently, a MOS image sensor has been used for a camera including a large-sized sensor having a lot of pixels, such as a single-lens reflex camera and a mirrorless single-lens reflex camera. Further, a broadcast camera and a cinema camera demand higher frame rate. That is, a MOS sensor having a large optical size has been demanded to attain a higher reading speed. It is thus necessary to reduce power consumption, while both contradictory requirements, i.e., an increase in size and an increase in speed, are satisfied.

For example, parasitic resistance can be reduced by increasing a wiring width of a pair of read bit lines. With this, parasitic resistance of a transfer bus can be reduced, whereby an increase in speed can be attained. However, since this method entails an increase in parasitic capacitance of the transfer bus and an increase in a chip area, it has a limitation in increasing speed.

Further, the configuration of the data transfer circuit disclosed in Unexamined Japanese Patent Publication No. 2000-207886 does not radically solve the problem of a delay in data transfer. This configuration aims to again transmit the data stored in the latch circuit (memory cell) using the sub-read circuit and common bit line gBL.

Therefore, even if parasitic resistance and parasitic capacitance connected to one driver can be reduced by a plurality of sub memory cell blocks, RC delay on common bit line gBL becomes dominant in the case where the parasitic resistance and parasitic capacitance of common bit line gBL connected to the sub-read circuit are extremely large. Consequently, this configuration does not lead to the improvement in the reading speed.

The present disclosure is accomplished in view of the above problem, and provides a solid-state imaging device that can enhance a reading speed. Exemplary embodiments according to the present disclosure will be described below with reference to the drawings.

Note that each of the exemplary embodiments described below only illustrates one specific example of the present disclosure. Numerical values, shapes, materials, constituent elements, arrangement position and connection manner of constituent elements, steps, the order of steps, and the like described in the exemplary embodiments below are merely illustrative and do not intend to limit the present disclosure. Further, among the constituent elements in the following exemplary embodiments, constituent elements not recited in any of the independent claims indicating the most generic concept are described as preferable constituent elements.

First Exemplary Embodiment

FIG. 1A is a block diagram illustrating a configuration of imaging device 100 (camera or camera module) according to the first exemplary embodiment of the present disclosure. As illustrated in FIG. 1A, imaging device 100 includes optical system 900, solid-state imaging device 1000, and image signal processor 1001 (image signal processing LSI). It is to be noted that, in the solid-state imaging device according to each of the exemplary embodiments described below, correlated double sampling (CDS) operation, in which a reset level read from a pixel (light-receiving unit) is subtracted from a signal level also read from the pixel as an offset, is performed in an analog region using sample/hold (S/H) capacitance and the like. Note that circuits and description thereof concerning the CDS operation will not be described below.

Optical system 900 includes lens 901 and mechanical shutter 902. Lens 901 converges light (for example, visible light) from a subject to form an image onto imaging region 102 of solid-state imaging device 1000. Mechanical shutter 902 is located on an optical path between lens 901 and solid-state imaging device 1000 for controlling an amount of light guided onto imaging region 102.

Image signal processor 1001 is an external LSI that performs various signal processes (image processes) to digital output data OUTPUT output from solid-state imaging device 1000.

Solid-state imaging device 1000 includes imaging region 102, row scanning circuit 930, AD conversion circuit 109, and data transfer circuit 110.

Figure 1B:
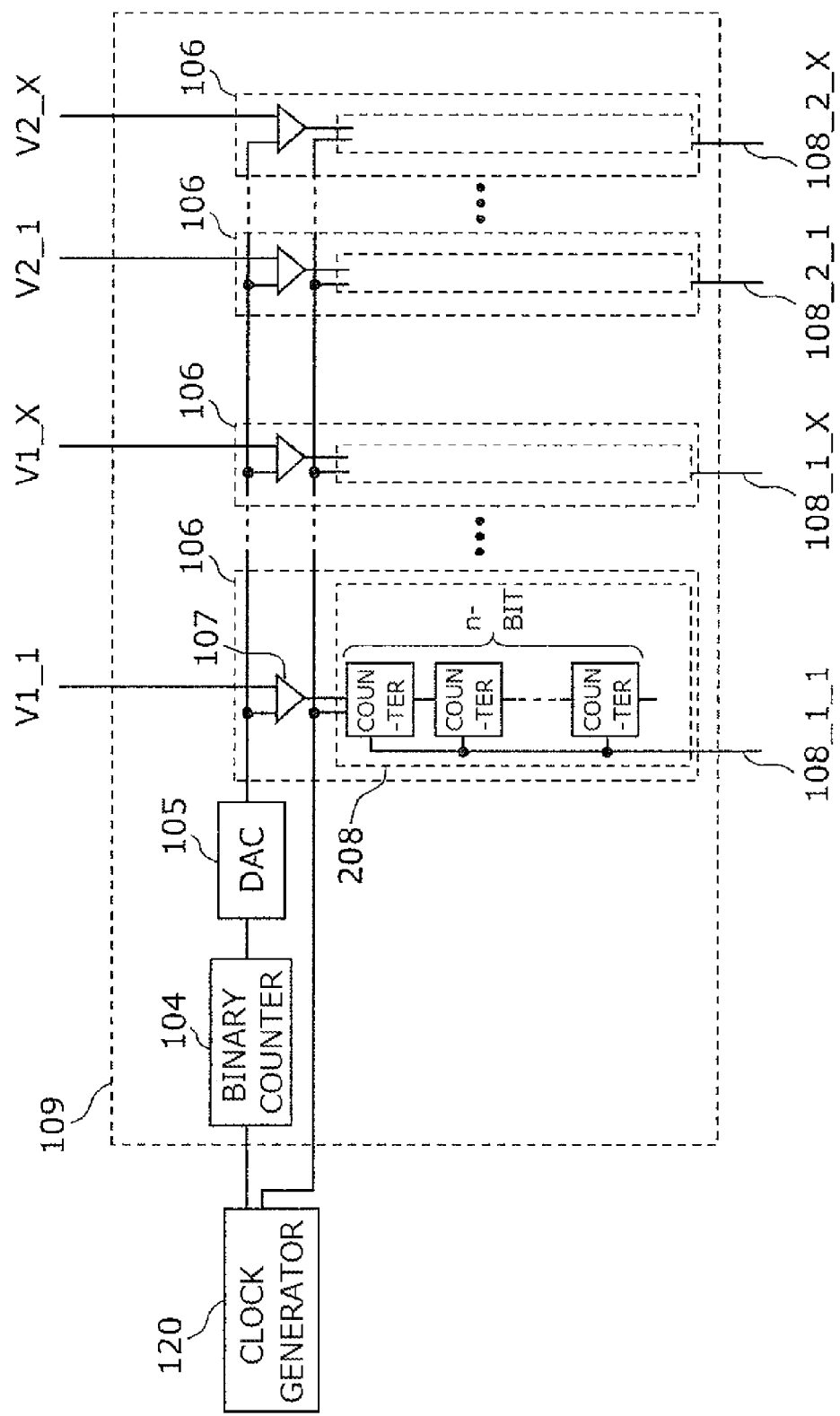
FIG. 1B is a block diagram illustrating a configuration of an AD conversion circuit according to the first exemplary embodiment.
Figure 1C:
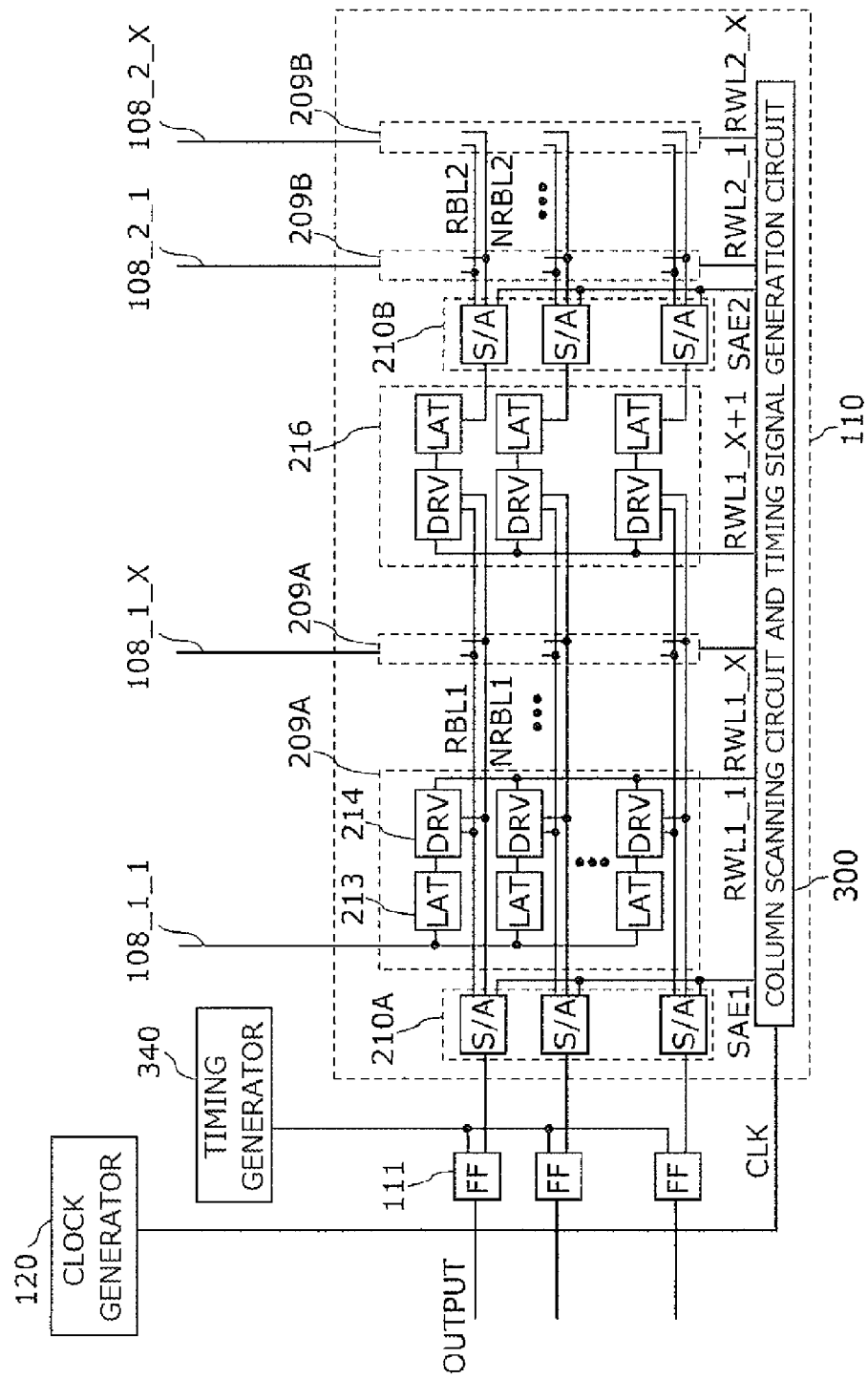
FIG. 1C is a block diagram illustrating a configuration of a data transfer circuit according to the first exemplary embodiment.

FIG. 1B is a diagram illustrating the configuration of AD conversion circuit 109 and its peripheral circuit. FIG. 1C is a diagram illustrating the configuration of data transfer circuit 110 and its peripheral circuit. As illustrated in FIGS. 1B and 1C, solid-state imaging device 1000 further includes a plurality of flip-flop circuits 111, clock generator 120, and timing generator 340. Further, AD conversion circuit 109 includes binary counter 104, D/A conversion circuit (hereinafter abbreviated as DAC) 105, a plurality of column A/D conversion circuits 106, and a plurality of counter-to-latch data transfer buses 108 (108_1_1 to 108_1_X and 108_2_1 to 108_2_X).

Row scanning circuit 930 scans a plurality of unit cells 101 so as to read signals from unit cells 101 on a row basis.

Clock generator 120 generates a clock signal (reference clock signal), and supplies the clock signal to binary counter 104 and column A/D conversion circuits 106.

Binary counter 104 counts the clock signal (reference clock signal), and supplies the counted value (binary value) to DAC 105.

Imaging region 102 includes a plurality of unit cells 101 (pixels) arrayed in a matrix. Here, each of unit cells 101 includes a light-receiving unit including a photoelectric conversion element that performs photoelectric conversion. For example, the photoelectric conversion element is a photosensitive element such as a photodiode or a photogate, a photoelectric conversion film formed from amorphous silicon, or an organic photoelectric conversion film. Each of unit cells 101 further includes a device for reading a signal generated by the photoelectric conversion and a device for performing an initialization operation, as necessary.

Column A/D conversion circuit 106 is provided for ½ column, one column, or multiple columns of unit cells 101. Column A/D conversion circuit 106 converts an analog signal output from corresponding unit cell 101 into a digital signal, and holds this digital signal. In FIGS. 1A to 1C, a plurality of column A/D conversion circuits 106 correspond to vertical signal lines V1_1 to V1_X and V2_1 to V2_X in imaging region 102 on a one-to-one basis. Specifically, column A/D conversion circuits 106 in number of 2X are provided. Each of column A/D conversion circuits 106 has a function of converting an analog signal into an n-bit digital signal. Each of column A/D conversion circuits 106 includes n-bit counter circuit 208. Further, a reference clock signal is supplied to column A/D conversion circuits 106 from clock generator 120.

DAC 105 generates an analog ramp voltage (triangular wave) according to the binary value input from binary counter 104. The analog ramp voltage is input to comparator 107 in each of column A/D conversion circuits 106.

Each of column A/D conversion circuits 106 includes comparator 107 and counter circuit 208.

Comparator 107 compares the analog ramp voltage generated by DAC 105 and a pixel signal of the corresponding column out of pixel signals obtained from unit cells 101 through vertical signal lines V1_1 to V1_X and V2_1 to V2_X for every row lines H1 to Hy.

Further, n-bit counter circuit 208 included in each of column A/D conversion circuits 106 counts a comparison time until the voltage value of the vertical signal line and the analog ramp voltage match each other for each unit cell 101 (counting operation). The counted value is pixel data.

Data transfer circuit 110 includes a plurality of latch driver circuits 209A and 209B, sense amplifiers 210A and 210B, and column scanning circuit and timing signal generation circuit 300.

Each of latch driver circuits 209A and 209B includes latch circuits 213 and driver circuits 214. Driver circuits 214 are connected to latch circuits 213 and read bit lines RBL1 and NRBL1 (or RBL2 and NRBL2).

Latch circuits 213 are n-bit latch circuits corresponding to counter circuits 208. After the end of the counting operation, n-bit counted values in counter circuits 208 are transferred to latch circuits 213 in data transfer circuit 110 through counter-to-latch data transfer buses 108. That is, pixel data is stored in latch circuits 213.

When any one of read word lines RWL1_1 to RWL1_X and RWL2_1 to RWL2_X is selected, the pixel data held in latch circuits 213 in latch driver circuit 209A or 209B connected to the selected read word line is transmitted to read bit lines RBL1 and NRBL1 (or RBL2 and NRBL2).

Clock signal CLK is supplied to column scanning circuit and timing signal generation circuit 300 from clock generator 120. Column scanning circuit and timing signal generation circuit 300 generates a pulse signal for driving read word lines RWL1_1, RWL1_2 to RWL1_X, and RWL2_1, RWL2_2 to RWL2_X, and a pulse signal (sense amplifier enable signals SAE1 and SAE2) for driving sense amplifier enable signal lines connected to sense amplifiers 210A and 210B.

Read word lines RWL1_1, RWL1_2 to RWL1_X, and RWL2_1, RWL2_2 to RWL2_X are sequentially selected by column scanning circuit and timing signal generation circuit 300. Then, the data held in latch circuits 213 included in latch driver circuit 209A or 209B corresponding to the selected read word line is transmitted to read bit lines RBL1 and NRBL1 (or RBL2 and NRBL2).

Sense amplifier 210A amplifies the signal transmitted to read bit lines RBL1 and NRBL1 and converts this signal into a digital signal. The obtained digital signal is output from flip-flop circuit 111. Sense amplifier 210B amplifies the signal transmitted to read bit lines RBL2 and NRBL2 and converts this signal into a digital signal.

Note that FIG. 1C does not illustrate a precharge circuit (described later) necessary for reading the data in latch circuits 213.

Data transfer circuit 110 will be described with reference to a block diagram in FIG. 2, detailed circuit diagrams in FIGS. 3A to 3D, and a waveform chart in FIG. 4.

In the drawings described below, the illustration and description concerning writing of pixel data from counter circuits 208 to latch circuits 213 are omitted, and the description will be given, on the assumption that the later-described pixel data is held in latch circuits 213.

Figure 2:
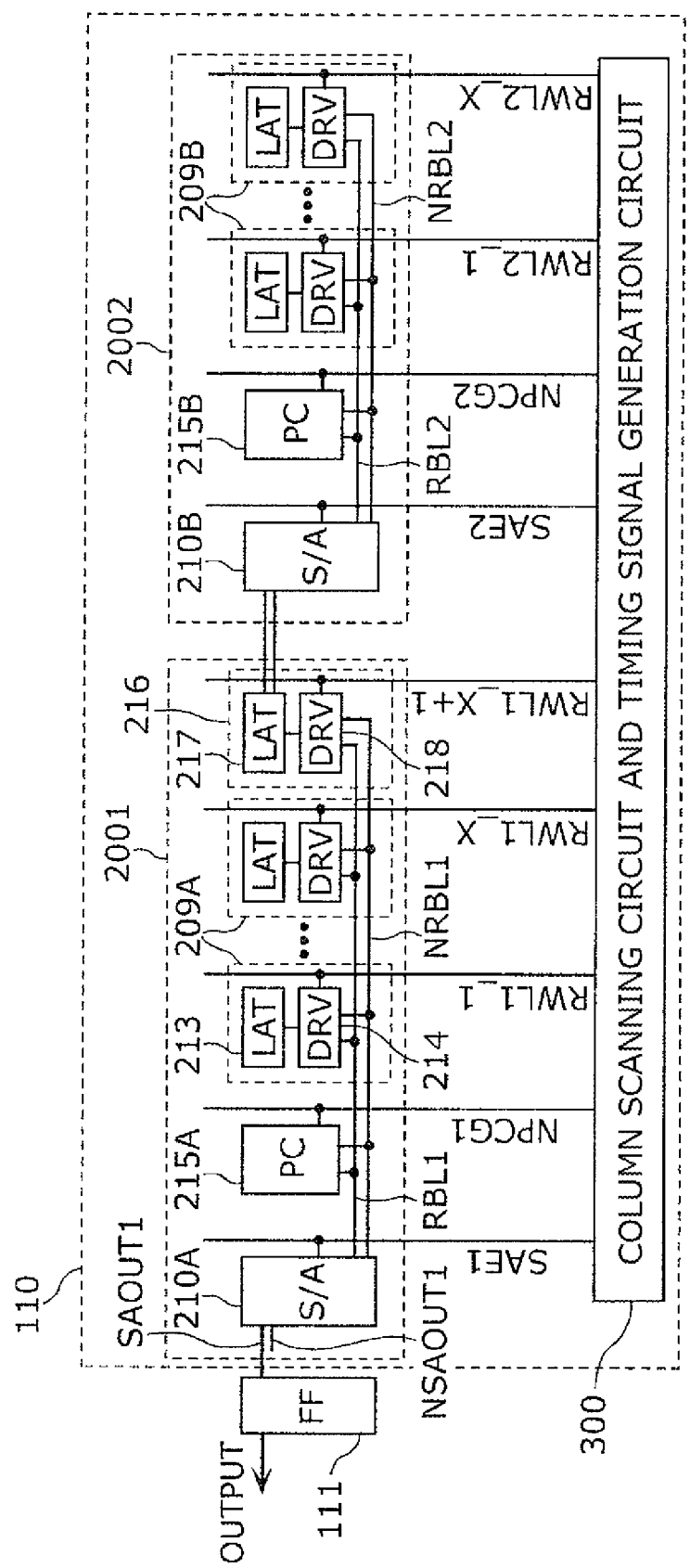
FIG. 2 is a block diagram illustrating the configuration of the data transfer circuit according to the first exemplary embodiment.

Further, FIG. 2 only illustrates the configuration corresponding to one bit in n-bit data transfer circuit 110 for simplifying the description.

Data transfer circuit 110 includes first segment 2001, second segment 2002, and column scanning circuit and timing signal generation circuit 300. First segment 2001 includes sense amplifier 210A, precharge circuit 215A, a plurality of latch driver circuits 209A, and intermediate latch driver circuit 216, each of which being connected to read bit lines RBL1 and NRBL1. Second segment 2002 includes sense amplifier 210B, precharge circuit 215B, and a plurality of latch driver circuits 209B, each of which being connected to read bit lines RBL2 and NRBL2.

As illustrated in FIGS. 1A to 1C, pixels in number of 2X are disposed in the horizontal direction, and latch driver circuits 209A and latch driver circuits 209B in number of 2X for holding pixel data are provided.

Further, an output terminal of sense amplifier 210B in second segment 2002 is connected to intermediate latch driver circuit 216 in first segment 2001.

In first segment 2001, sense amplifier enable signal SAE1 generated from column scanning circuit and timing signal generation circuit 300 is input to sense amplifier 210A. When sense amplifier enable signal SAE1 is activated to an H (high) level, sense amplifier 210A amplifies and converts a small potential difference between read bit lines RBL1 and NRBL1 into a digital signal, and outputs the obtained signal to output terminals SAOUT1 and NSAOUT1.

Output terminal SAOUT1 of sense amplifier 210A is connected to an input terminal of flip-flop circuit 111, and the signal output from sense amplifier 210A is output as output data OUTPUT.

Precharge signal NPCG1 generated by column scanning circuit and timing signal generation circuit 300 is input to precharge circuit 215A. When precharge signal NPCG1 is activated to an L (low) level, precharge circuit 215A precharges read bit lines RBL1 and NRBL1 to the H level.

As described in FIG. 1C, a plurality of latch driver circuits 209A are connected to read word lines RWL1_1 to RWL1_X. When the corresponding read word line is activated to the H level by column scanning circuit and timing signal generation circuit 300, latch driver circuit 209A outputs the data in latch circuits 213 to read bit lines RBL1 and NRBL1 through driver circuits 214.

Intermediate latch driver circuit 216 is connected to read word line RWL_X+1. When read word line RWL1_X+1 is activated to the H level, intermediate latch driver circuit 216 outputs the data in intermediate latch circuit 217 to read bit lines RBL1 and NRBL1 through intermediate driver circuit 218.

In second segment 2002, sense amplifier enable signal SAE2 generated from column scanning circuit and timing signal generation circuit 300 and the signals on read bit lines RBL2 and NRBL2 are input to sense amplifier 210B. When sense amplifier enable signal SAE2 is activated to the H level, sense amplifier 210B amplifies and converts a small potential difference between read bit lines RBL2 and NRBL2 into a digital signal, and outputs the obtained signal to output terminals SAOUT2 and NSAOUT2. Thus, the data read on read bit lines RBL2 and NRBL2 is written into intermediate latch circuit 217 in intermediate latch driver circuit 216 in first segment 2001.

Precharge signal NPCG2 generated by column scanning circuit and timing signal generation circuit 300 is input to precharge circuit 215B. When precharge signal NPCG2 is activated to the L level, precharge circuit 215B precharges read bit lines RBL2 and NRBL2 to the H level.

A plurality of latch driver circuits 209B are connected to read word lines RWL2_1 to RWL2_X. When the corresponding read word line is activated to the H level by column scanning circuit and timing signal generation circuit 300, latch driver circuit 209B outputs the data in latch circuits 213 to read bit lines RBL2 and NRBL2 through driver circuits 214.

FIGS. 3A to 3D are diagrams illustrating in detail the configuration of data transfer circuit 110 illustrated in FIG. 2.

Figure 3A:
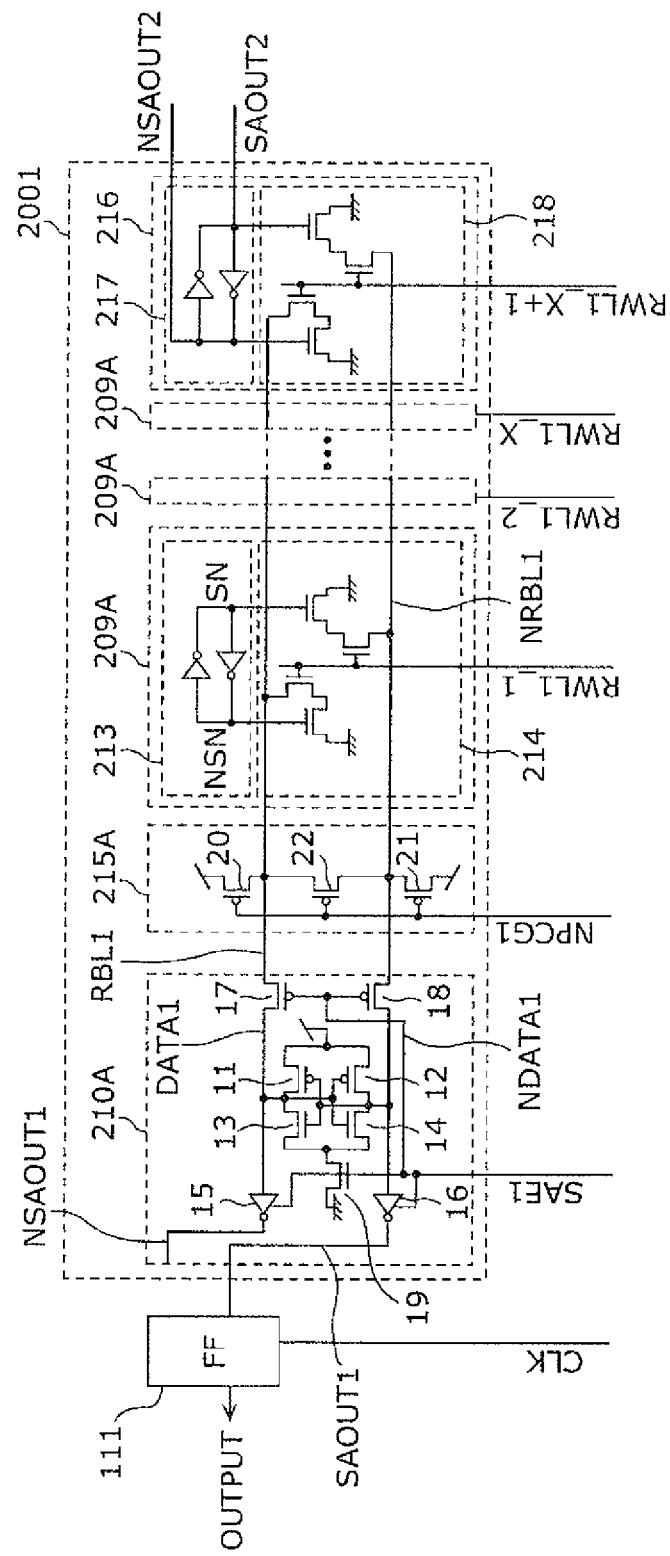
FIG. 3A is a circuit diagram illustrating in detail the configuration of the data transfer circuit according to the first exemplary embodiment.
Figure 3B:
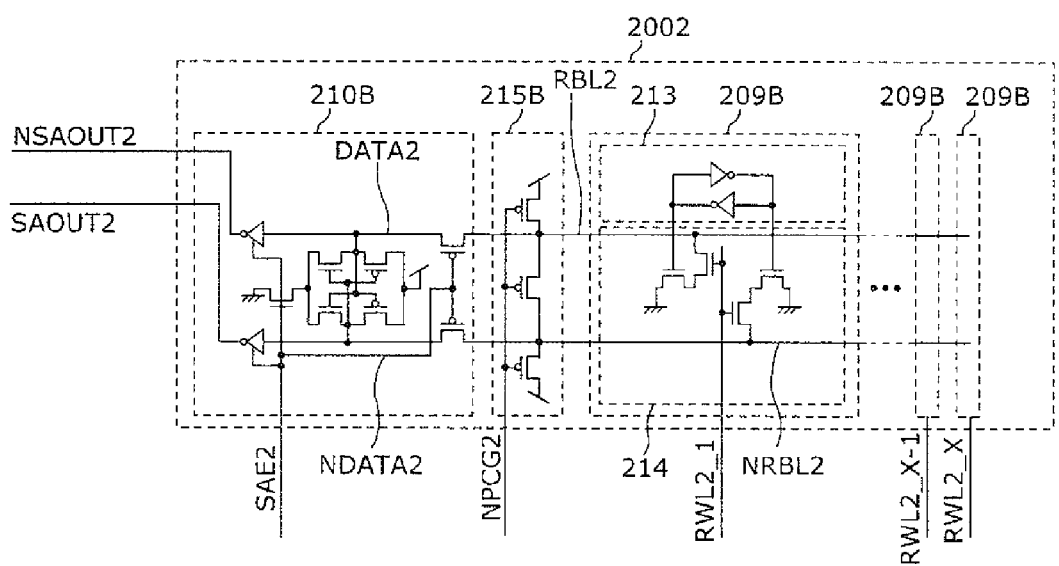
FIG. 3B is a circuit diagram illustrating in detail the configuration of the data transfer circuit according to the first exemplary embodiment.
Figure 3C:
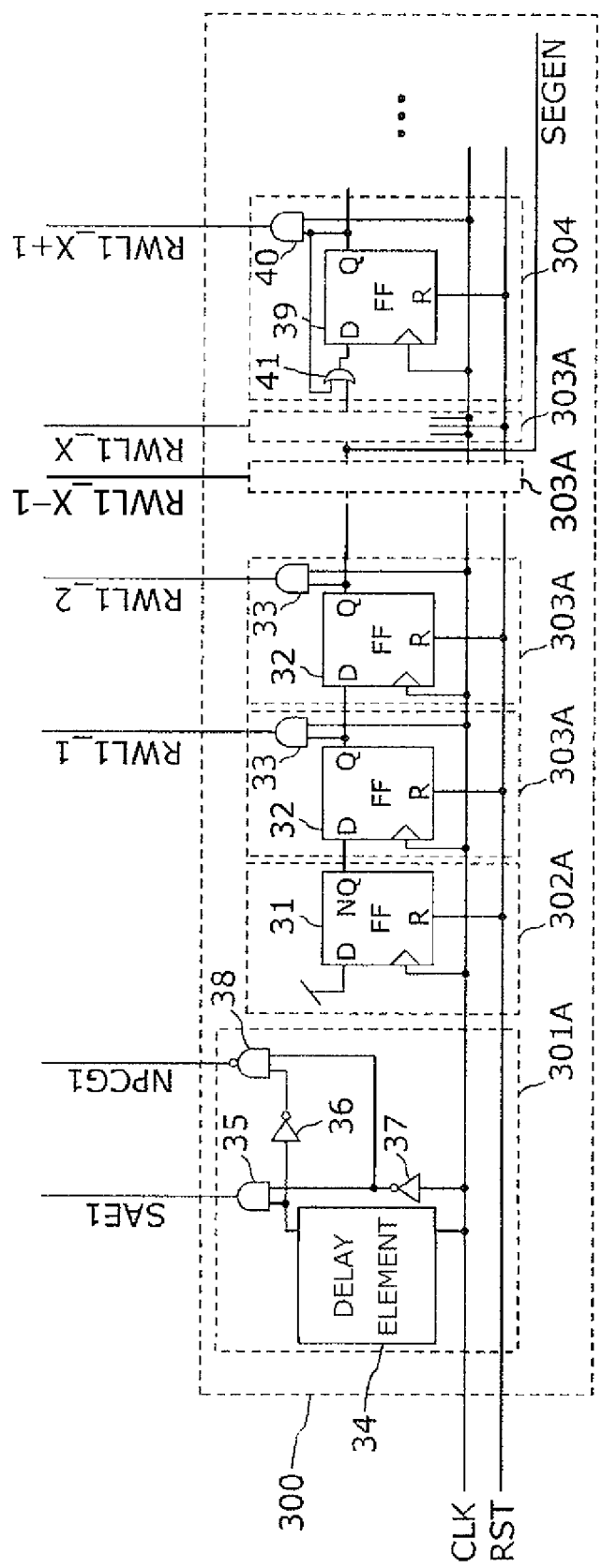
FIG. 3C is a circuit diagram illustrating in detail the configuration of the data transfer circuit according to the first exemplary embodiment.
Figure 3D:
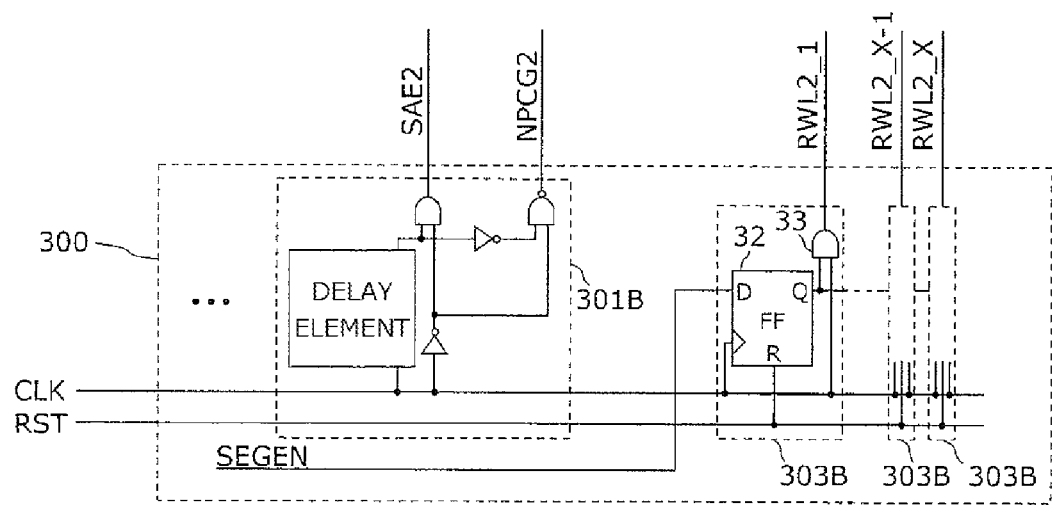
FIG. 3D is a circuit diagram illustrating in detail the configuration of the data transfer circuit according to the first exemplary embodiment.

Sense amplifier 210A illustrated in FIG. 3A includes Pch transistors 11, 12, 17, and 18, Nch transistors 13, 14, and 19, and tri-state inverters 15 and 16. The inverter composed of Pch transistor 11 and Nch transistor 13 and the inverter composed of Pch transistor 12 and Nch transistor 14 are cross coupled to each other. Sources of Pch transistors 11 and 12 are connected to a power supply, and sources of Nch transistors 13 and 14 are connected to a drain of Nch transistor 19. A source of Nch transistor 19 is connected to a ground.

An output terminal of the inverter composed of Pch transistor 11 and Nch transistor 13 is connected to an input terminal of tri-state inverter 15 through data line DATA1. An output terminal of the inverter composed of Pch transistor 12 and Nch transistor 14 is connected to an input terminal of tri-state inverter 16 through data line NDATA1. Sense amplifier enable signal SAE1 is input to control terminals of tri-state inverters 15 and 16.

A drain and a source of Pch transistor 17 are connected to read bit line RBL1 and data line DATA1, respectively. A drain and a source of Pch transistor 18 are connected to read bit line NRBL1 and data line NDATA1, respectively.

In the case where sense amplifier enable signal SAE1 is in a deactivated state that is the L level, sense amplifier 210A transmits the potential difference between read bit lines RBL1 and NRBL1 to data lines DATA1 and NDATA1.

In the case where sense amplifier enable signal SAE1 is activated to the H level, sense amplifier 210A amplifies the small potential difference between data lines DATA1 and NDATA1 up to a power supply voltage or a ground potential, and outputs the obtained signal to output terminals SAOUT1 and NSAOUT1 through tri-state inverters 15 and 16.

The configuration and operation of sense amplifier 210A in first segment 2001 have been described above, and the configuration and operation of sense amplifier 210B in second segment 2002 are similar to those of sense amplifier 210A.

Precharge circuit 215A includes three Pch transistors 20, 21, and 22.

Precharge signal NPCG1 is input to gates of Pch transistors 20, 21, and 22. When precharge signal NPCG1 is activated to the L level, precharge circuit 215A performs an equalizing operation for precharging read bit lines RBL1 and NRBL1 to the power supply voltage.

The configuration and operation of precharge circuit 215A in first segment 2001 have been described above, and the configuration and operation of precharge circuit 215B in second segment 2002 are similar to those of precharge circuit 215A.

Each of latch circuits 213 includes two cross-coupled inverters. Output terminals (storage node SN and NSN) of the respective inverters are connected to driver circuit 214.

Column scanning circuit and timing signal generation circuit 300 includes sense amplifier precharge enable generation circuits 301A and 301B, start address generation circuit 302A, a plurality of read word line signal generation circuits 303A and 303B, and intermediate read word line signal generation circuit 304.

Read word line signal generation circuit 303A includes flip-flop 32 and AND element 33. The configuration of read word line signal generation circuit 303B is the same as the configuration of read word line signal generation circuit 303A. A plurality of read word line signal generation circuits 303A that output signals to read word lines RWL1_1 to RWL1_X are connected in series, and function as a shift resistor. Similarly, a plurality of read word line signal generation circuits 303B that output signals to read word lines RWL2_1 to RWL2_X are connected in series, and function as a shift resistor.

Intermediate read word line signal generation circuit 304 includes flip-flop 39, OR element 41, and AND element 40, and outputs a signal to read word line RWL1_X+1. A D input terminal of flip-flop 39 is connected to an output terminal of OR element 41. A Q output terminal of flip-flop 39 is connected to one of input terminals of OR element 41 and one of input terminals of AND element 40.

An output terminal of read word line signal generation circuit 303A that outputs a signal to read word line RWL1_X is connected to the other input terminal of OR element 41 in intermediate read word line signal generation circuit 304. A Q output terminal of flip-flop 39 in read word line signal generation circuit 303A that outputs a signal to read word line RWL1_X−1 is connected to a D input terminal of flip-flop 32 in read word line signal generation circuit 303B that outputs a signal to read word line RWL2_1.

Reset signal RST is input to reset terminals of flip-flops 32 and 39 included in read word line signal generation circuits 303A and 303B and intermediate read word line signal generation circuit 304. In the case where reset signal RST is activated to the H level, flip-flops 32 and 39 reset the Q output terminals to the L level.

Reset signal RST is input to a reset terminal of flip-flop 31 in start address generation circuit 302A. In the case where reset signal RST is activated to the H level, flip-flop 31 resets an NQ output terminal to the H level.

Sense amplifier precharge enable generation circuit 301A includes delay element 34, AND element 35, NAND element 38, and inverter elements 36 and 37. Clock signal CLK is input to sense amplifier precharge enable generation circuit 301A. Further, sense amplifier precharge enable generation circuits 301A and 301B output sense amplifier enable signals SAE1 and SAE2 and precharge signals NPCG1 and NPCG2. This operation will be described later. The configuration of sense amplifier precharge enable generation circuit 301B is also similar to the configuration of sense amplifier precharge enable generation circuit 301A.

Figure 4:
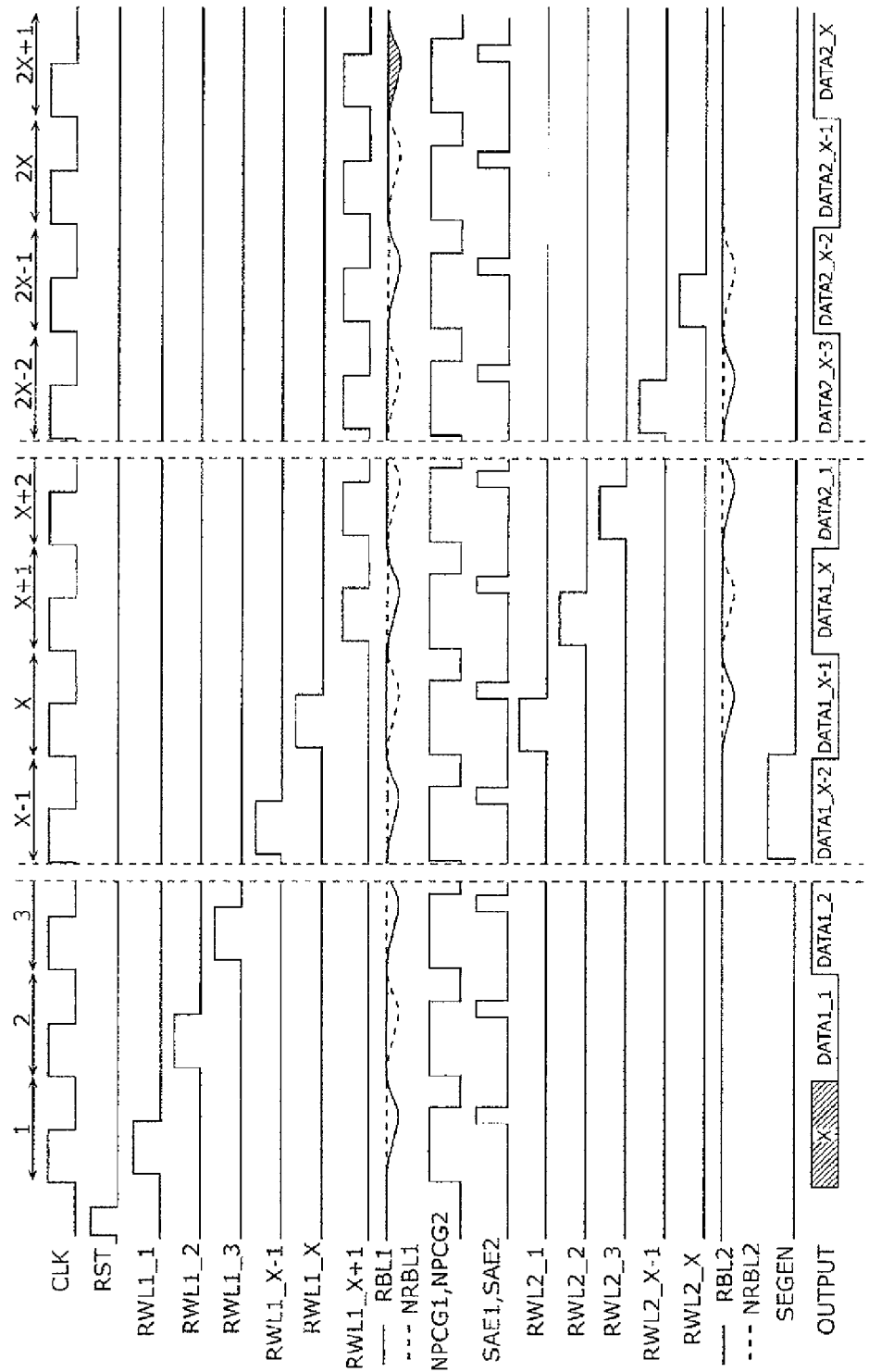
FIG. 4 is a timing chart illustrating an operation according to the first exemplary embodiment.

FIG. 4 is a timing chart specifically illustrating the operation of data transfer circuit 110 illustrated in FIGS. 3A to 3D. For the sake of convenience of the description, cycle names from 1 to 2X+1 are attached on clock signal CLK. In the present description, X is an even number.

Further, in the description below, storage node SN of each of latch circuits 213 corresponding to read word line RWL1_1 holds the L level, and storage node NSN thereof holds the H level (pixel data: L). Storage node SN of each of latch circuits 213 corresponding to read word line RWL1_2 holds the H level, and storage node NSN thereof holds the L level (pixel data: H). Inverted data is stored in subsequent adjacent latch circuits 213.

Similarly, storage node SN of each of latch circuits 213 corresponding to read word line RWL2_1 holds the L level, and storage node NSN thereof holds the H level (pixel data: L). Storage node SN of each of latch circuits 213 corresponding to read word line RWL2_2 holds the H level, and storage node NSN thereof holds the L level (pixel data: H). Inverted data is stored in subsequent adjacent latch circuits 213.

Before cycle 1, reset signal RST is activated for initializing the inside of column scanning circuit and timing signal generation circuit 300. With this, flip-flops 31, 32, and 39 are initialized. Thus, the D input terminal of flip-flop 32 in read word line signal generation circuit 303A that outputs a signal to read word line RWL1_1 is set to the H level.

Further, since clock signal CLK is in the L level before cycle 1, precharge signal NPCG1 is activated to the L level by sense amplifier precharge enable generation circuit 301A.

Thus, read bit lines RBL1 and NRBL1 are precharged to the H level by precharge circuit 215A (precharge operation).

At that time, sense amplifier enable signal SAE1 is in the deactivated state that is the L level.

When clock signal CLK rises to the H level in cycle 1, precharge signal NPCG1 becomes the H level. With this, precharge circuit 215A is deactivated, whereby the precharge operation is canceled.

Simultaneously, the Q output terminal of flip-flop 32 in read word line signal generation circuit 303A connected to read word line RWL1_1 is activated to the H level at the leading edge of clock signal CLK to the H level, whereby read word line RWL1_1 is activated by AND element 33. Read word line RWL1_1 becomes the H level during a period which is a half of the clock cycle.

The data in latch circuits 213 read by the activation operation of read word line RWL1_1 is the L-level pixel data as described above. Accordingly, when read word line RWL1_1 is activated to the H level, driver circuits 214 are activated, whereby the voltage of read bit line RBL1 which has been precharged transfers to a level lower than the power supply voltage.

Since Pch transistors 17 and 18 in sense amplifier 210A are in the activated state, the voltage of data line DATA1 transfers to a level lower than the power supply voltage, as in read bit line RBL1. On the other hand, the level of the voltage of read bit line NRBL1 which has been precharged is maintained.

When clock signal CLK drops to the L level in cycle 1, sense amplifier precharge enable generation circuit 301A activates sense amplifier enable signal SAE1 to the H level. At that time, the voltage of data line DATA1 is lower than the voltage of data line NDATA1, so that the voltage of data line DATA1 drops to the L level (sense operation).

Simultaneously, tri-state inverters 15 and 16 are activated, whereby output terminal SAOUT1 drops to the L level.

After a certain period of time (the delay time of delay element 34) after clock signal CLK drops to the L level, the L level is transmitted to AND element 35 in sense amplifier precharge enable generation circuit 301A, whereby sense amplifier enable signal SAE1 drops. Simultaneously, precharge signal NPCG1 drops, so that precharging to read bit lines RBL1 and NRBL1 is started for preparation of the next cycle.

When clock signal CLK transfers to the H level in cycle 2, flip-flop circuit 111 retrieves the data of output terminal SAOUT1 of sense amplifier 210A, and outputs the L-level pixel data in latch circuits 213 corresponding to read word line RWL1_1 as output data OUTPUT. Note that, for the sake of convenience of the description, DATA1_1 indicating the pixel data corresponding to read word line RWL1_1 is written on the waveform of output data OUTPUT.

The subsequent operation in cycle 2 is similar to the operation in cycle 1, except that the read word line to be activated is read word line RWL1_2. In cycle 2, the H-level pixel data is held as the data in latch circuits 213 corresponding to read word line RWL1_2. Therefore, the H-level pixel data (DATA1_2) is output at the same timing as the leading edge of clock signal CLK in cycle 3.

Thereafter, the similar operation is continued. In cycle X, the D input terminal of flip-flop 32 in read word line signal generation circuit 303A connected to read word line RWL1_X becomes the H level, and segment enable signal SEGEN is activated at the leading edge of clock signal CLK, whereby two read word lines, i.e., read word lines RWL1_X and RWL2_1 are activated.

Note that, the operation of reading the H-level pixel data in latch circuits 213 corresponding to read word line RWL1_X through read bit lines RBL1 and NRBL1 is performed in cycle X as in the cycles described above. On the other hand, read word line RWL2_1 in second segment 2002 is activated, so that the L-level pixel data in latch circuits 213 corresponding to read word line RWL2_1 is output to read bit lines RBL2 and NRBL2. In this case, since the data is the L-level pixel data, the voltage of read bit line RBL2 transfers to a level lower than the power supply voltage.

Sense amplifier enable signal SAE2 and precharge signal NPCG2 change in the same manner as sense amplifier enable signal SAE1 and precharge signal NPCG1. Therefore, in the same cycle, sense amplifier 210B in second segment 2002 outputs data to intermediate latch circuit 217 in first segment 2001 through output terminals SAOUT2 and NSAOUT2.

Similar to latch circuits 213, intermediate latch circuit 217 includes two cross-coupled inverters to hold data. Intermediate latch circuit 217 keeps on holding the data during the period before sense amplifier enable signal SAE2 is activated to the H level. Specifically, in cycle X, the data corresponding to read word line RWL2_1 in second segment 2002 is transferred to intermediate latch circuit 217 in first segment 2001.

Note that, reading of data from intermediate latch circuit 217 is performed during the period in which clock signal CLK is in the H level, and writing of pixel data to latch circuits 213 is performed during a certain period after clock signal CLK transfers to the L level. Therefore, the operation of writing data to latch circuits 213 does not interfere with the operation of reading data from intermediate latch circuit 217 in the same cycle.

In cycle X+1, at the leading edge of clock signal CLK, data DATA1_X is output, so that read word line RWL1_X+1 is activated. The pixel data held in latch circuits 213 corresponding to read word line RWL2_1 in second segment 2002 in the previous cycle X is held in intermediate latch circuit 217 corresponding to read word line RWL1_X+1. The pixel data corresponding to read word line RWL1_X+1 is read to output terminal SAOUT1 through read bit lines RBL1 and NRBL1 and sense amplifier 210A in first segment 2001 as in the previous cycle. On the other hand, in this cycle, the data in latch circuits 213 corresponding to read word line RWL2_2 is read through read bit lines RBL2 and NRBL2, and this data is transferred to intermediate latch circuit 217 in first segment 2001 simultaneously with the activation of sense amplifier enable signal SAE2.

Intermediate read word line signal generation circuit 304 includes flip-flop 39, AND element 40, and OR element 41. A Q output terminal of flip-flop 39 is connected to an input terminal of OR element 41 for loop holding. Therefore, when the Q output terminal of flip-flop 39 once becomes the H level, the Q output terminal is kept at the H level unless the reset operation is performed. With this configuration, the state in which read word line RWL1_X+1 is activated is maintained in the subsequent cycles.

In cycle X+2, at the leading edge of clock signal CLK, data DATA2_1 is output, and the reading operation is performed as in cycle X+1.

Thereafter, the reading operation is sequentially performed, and data in all latch circuits is completely read in cycle 2X+1.

Note that, in FIG. 4, none of the read word lines included in second segment 2002 is selected in cycle 2X. This is because the sequential shift operation to the read word lines in second segment 2002 is completed.

Therefore, in cycle 2X+1, the data in intermediate latch circuit 217 becomes undefined. Accordingly, read bit lines RBL1 and NRBL1 are described as being undefined in cycle 2X+1.

As described above, in data transfer circuit 110, the read bit lines are divided, and the sense amplifier is provided in each segment. Thus, data transfer circuit 110 can sequentially read the data in a plurality of latch circuits 213. In general, a signal transmission time of a read bit line is determined by an RC product of the read bit line. Therefore, as the distance of the read bit line is shorter, the signal transmission time becomes shorter. In the present configuration, the length of the read bit line is a half of the read bit line which is not divided. Therefore, the R and the C of the read bit line are a half of the R and a half of the C of the read bit line which is not divided. Accordingly, the signal transmission time of the read bit line is decreased to a quarter of the signal transmission time of the read bit line which is not divided.

That is, when the read bit line is divided, an operating frequency can be four times greater than that in the case in which the read bit line is not divided. The signal of the read bit line is transmitted with a small amplitude as described above. Therefore, high-speed reading is enabled with less power penalty.

Further, since a reading frequency is increased, the solid-state imaging device using the technique according to the present disclosure can realize a high frame rate, and thus, can realize photographing with high image quality.

Note that the present configuration is applicable to realize high-speed reading, not only in a solid-state imaging device, but also in a semiconductor memory device that sequentially performs reading.

As described above, solid-state imaging device 1000 according to the present exemplary embodiment includes: a plurality of pixels (unit cells 101) arrayed in a matrix; a plurality of third latch circuits (latch circuits 213 included in a plurality of latch driver circuits 209A); a second read bit line (read bit lines RBL1 and NRBL1); a plurality of third driver circuits (driver circuits 214 included in a plurality of latch driver circuits 209A); a second amplifier (sense amplifier 210A); a plurality of first latch circuits (a plurality of latch circuits 213 included in a plurality of latch driver circuits 209B); a first read bit line (read bit lines RBL2 and NRBL2); a plurality of first driver circuits (a plurality of driver circuits 214 included in a plurality of latch driver circuits 209B); a first amplifier (sense amplifier 210B); a second latch circuit (intermediate latch circuit 217); a second driver circuit (intermediate driver circuit 218); an output driver (flip-flop circuit 111); and a column scanning circuit (column scanning circuit and timing signal generation circuit 300).

Each of the plurality of third latch circuits is provided so as to correspond to a different one of a plurality of second unit columns (V1_1 to V1_X), and holds second pixel data obtained by converting an analog signal into a digital signal, the analog signal being generated from a pixel located on a corresponding one of the second unit columns out of the plurality of pixels. In this case, a unit column indicates a unit of columns including one or more columns. In other words, each of the plurality of third latch circuits is provided for one column or for multiple columns. Note that the unit column may be a unit corresponding to ½ column.

Each of the plurality of third driver circuits is provided so as to correspond to a different one of the plurality of second unit columns, and outputs the second pixel data, which is held in a corresponding one of the third latch circuits provided to the second unit columns, respectively, to the second read bit line.

The second amplifier amplifies a voltage of the second read bit line to generate second data.

Each of the plurality of first latch circuits is provided so as to correspond to a different one of a plurality of first unit columns (V2_1 to V2_X) different from the plurality of second unit columns, and holds first pixel data obtained by converting an analog signal into a digital signal, the analog signal being generated from a pixel located on a corresponding one of the first unit columns out of the plurality of pixels. Further, the plurality of second unit columns are successive unit columns, and the plurality of first unit columns are successive unit columns, for example.

Each of the plurality of first driver circuits is provided so as to correspond to a different one of the plurality of first unit columns, and outputs the first pixel data, which is held in a corresponding one of the first latch circuits provided to the first unit columns, respectively, to the first read bit line.

The first amplifier amplifies a voltage of the first read bit line to generate first data.

The second latch circuit holds the first data generated by the first amplifier. The second driver circuit outputs the first data held in the second latch circuit to the second read bit line. The output driver outputs the second data.

The column scanning circuit (1) sequentially outputs a plurality of the second pixel data corresponding to the plurality of second unit columns to the second amplifier through the second read bit line by sequentially selecting the plurality of third driver circuits, and (2) sequentially outputs a plurality of the first pixel data corresponding to the plurality of first unit columns to the second amplifier through the first read bit line, the first amplifier, the second latch circuit, the second driver circuit, and the second read bit line by sequentially selecting the plurality of first driver circuits and selecting the second driver circuit.

With this configuration, two read bit lines are used in the solid-state imaging device according to the present exemplary embodiment. Thus, compared to the case where a single read bit line is used, a load (resistance and capacitance component) of each read bit line can be reduced, whereby a signal can be transmitted at high speed through the read bit line. Thus, a reading speed can be increased.

Second Exemplary Embodiment

In the present exemplary embodiment, a modification of the first exemplary embodiment will be described. Note that the components similar to those in the previous exemplary embodiment will not repeatedly be described, and the different points will mainly be described in the exemplary embodiment below.

Figure 5:
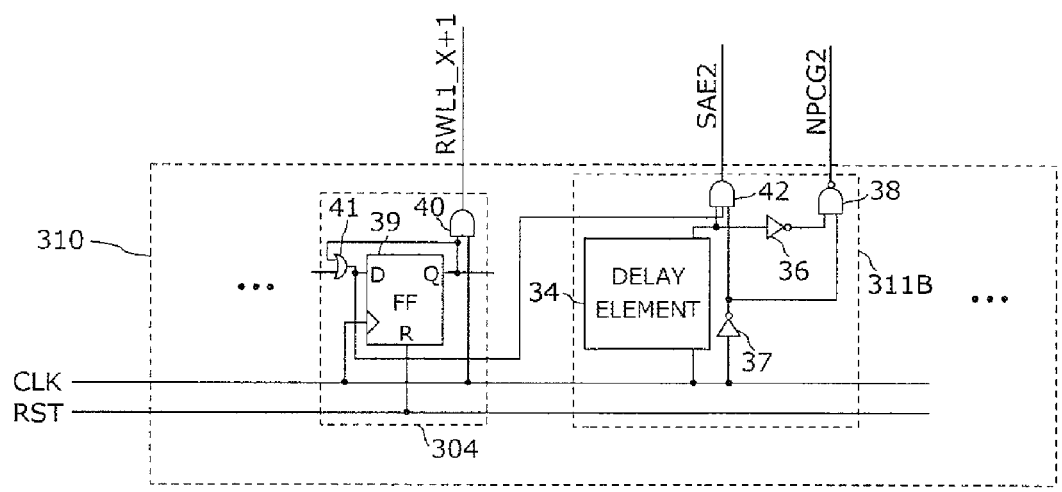
FIG. 5 is a circuit diagram illustrating a configuration of a data transfer circuit according to a second exemplary embodiment.

FIG. 5 is a diagram illustrating a configuration of column scanning circuit and timing signal generation circuit 310 according to the present exemplary embodiment. Column scanning circuit and timing signal generation circuit 310 is different from column scanning circuit and timing signal generation circuit 300 according to the first exemplary embodiment illustrated in FIGS. 3C and 3D in that sense amplifier precharge enable generation circuit 301B is replaced by intermediate sense amplifier precharge enable generation circuit 311B.

Specifically, an output signal from OR element 41, which is in intermediate read word line signal generation circuit 304 corresponding to read word line RWL1_X+1, is input to AND element 42 in intermediate sense amplifier precharge enable generation circuit 311B. The other circuit configurations are the same as those in the first exemplary embodiment.

Sense amplifier enable signal SAE2 generated by column scanning circuit and timing signal generation circuit 310 is gated by an output signal from OR element 41 in intermediate read word line signal generation circuit 304. Thus, sense amplifier enable signal SAE2 is activated only by the activation of the output signal from OR element 41 to the H level.

Figure 6:
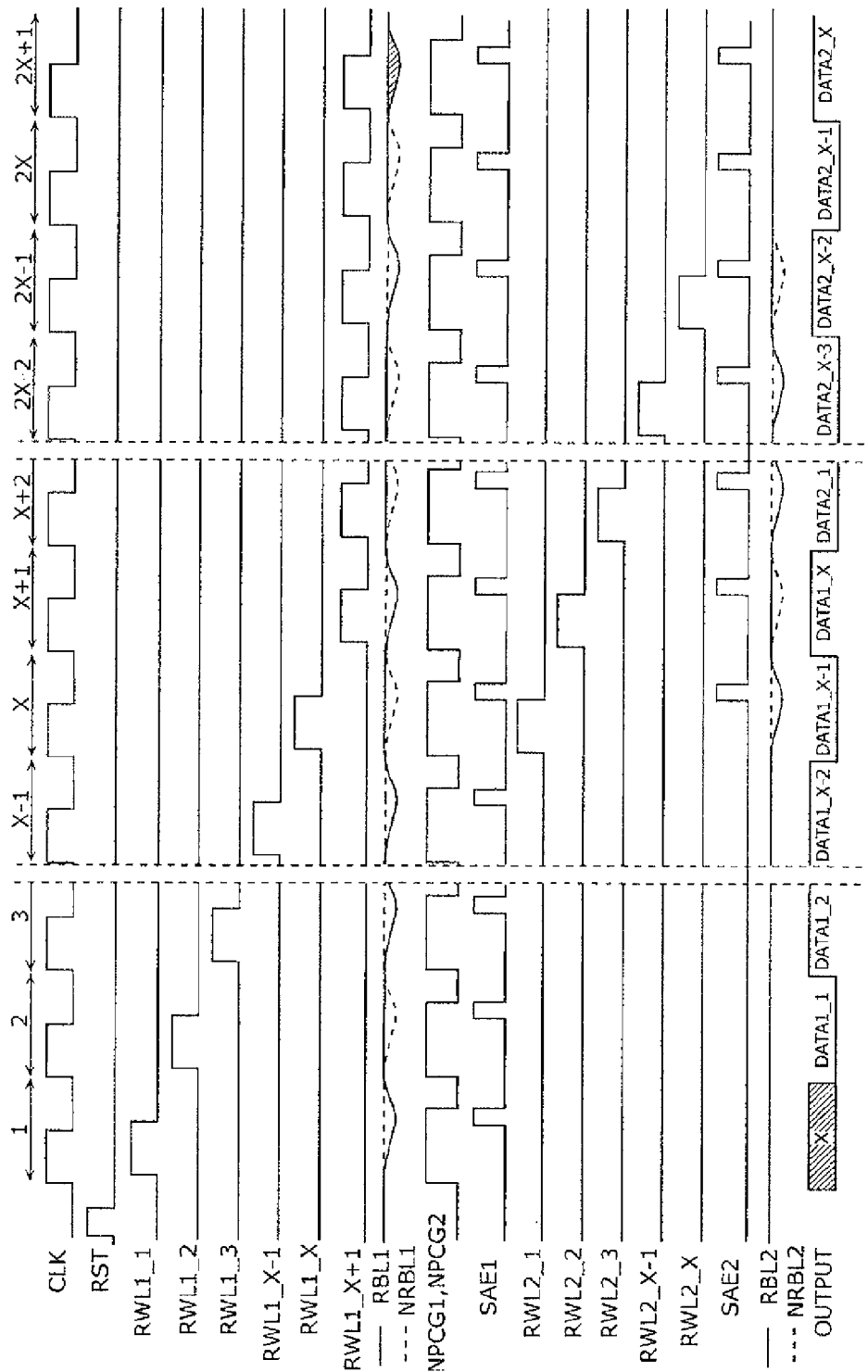
FIG. 6 is a timing chart illustrating an operation according to the second exemplary embodiment.

Sense amplifier enable signal SAE2 is activated after the cycle in which read word line RWL1_X is activated, that is, after cycle X in FIG. 6.

As illustrated in FIG. 6, none of read word lines RWL2_1, RWL2_2 to RWL2_X in second segment 2002 is activated from cycle 1 to cycle X−1, so that it is unnecessary that intermediate sense amplifier precharge enable generation circuit 311B in second segment 2002 is activated.

After cycle X, read word lines RWL2_1, RWL2_2, . . . in second segment 2002 are sequentially activated. Therefore, sense amplifier enable signal SAE2 is activated only after cycle X.

With this configuration, the operation unnecessary for the circuit operation can be reduced in the second exemplary embodiment, compared to the first exemplary embodiment. Thus, power required to read pixel data held in latch circuits 213 in first segment 2001 and second segment 2002 can further be reduced.

As described above, the first amplifier (sense amplifier 210B) is activated only in the cycle in which the plurality of first driver circuits (the plurality of driver circuits 214 included in the plurality of latch driver circuits 209B) is activated. Thus, the first amplifier is activated only in a necessary period, whereby power consumption is reduced.

Third Exemplary Embodiment

Figure 7:
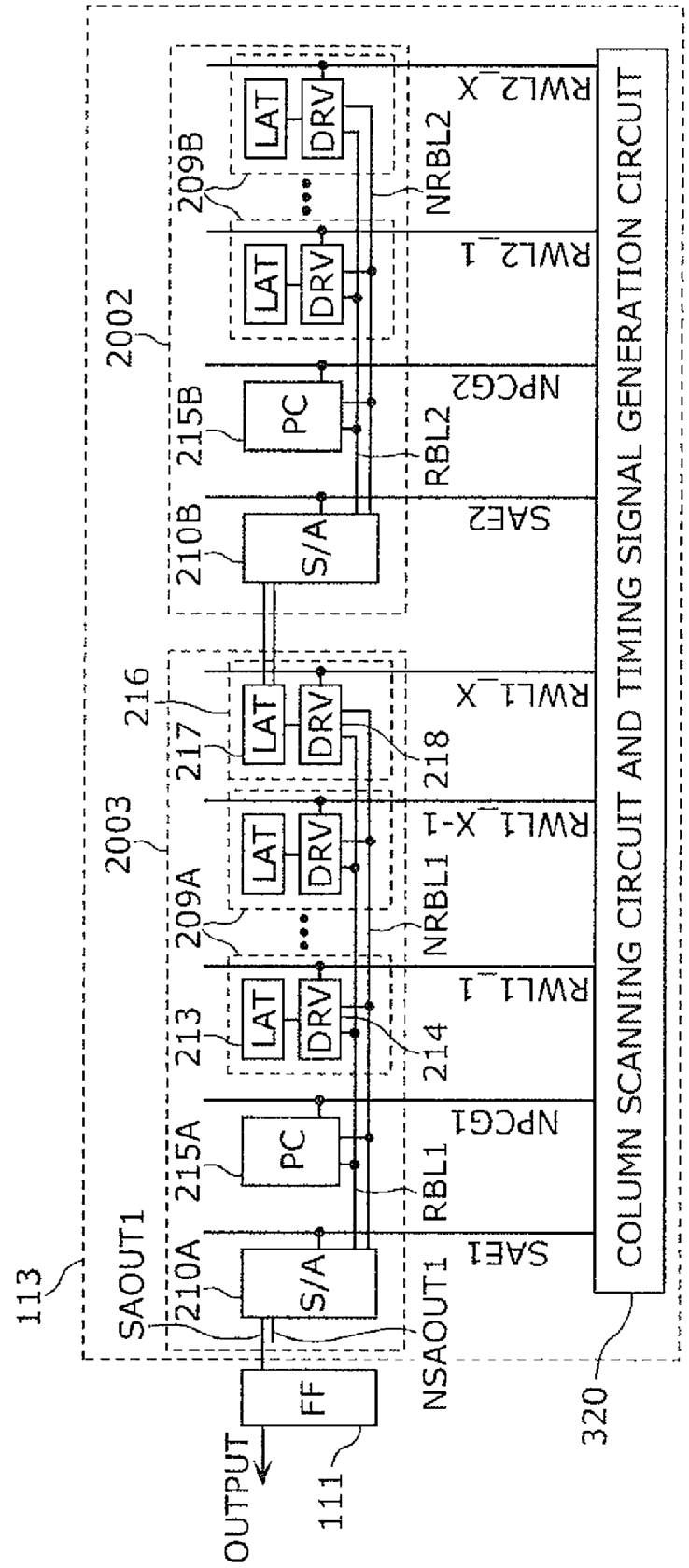
FIG. 7 is a block diagram illustrating a configuration of a data transfer circuit according to a third exemplary embodiment.

FIG. 7 is a diagram illustrating a configuration of data transfer circuit 113 according to the present exemplary embodiment. In FIG. 7, only the configuration corresponding to one bit is illustrated, as in FIG. 2. Compared to data transfer circuit 110 according to the first exemplary embodiment illustrated in FIG. 2, data transfer circuit 113 includes first segment 2003 in place of first segment 2001. In first segment 2003, intermediate latch driver circuit 216 is shared by the latch driver circuit connected to read word line RWL1_X. Specifically, the number of the latch driver circuits (including intermediate latch driver circuit 216) in first segment 2003 and second segment 2002 illustrated in FIG. 7 is equal to the number 2X of the pixels arrayed in the horizontal direction.

Figure 8A:
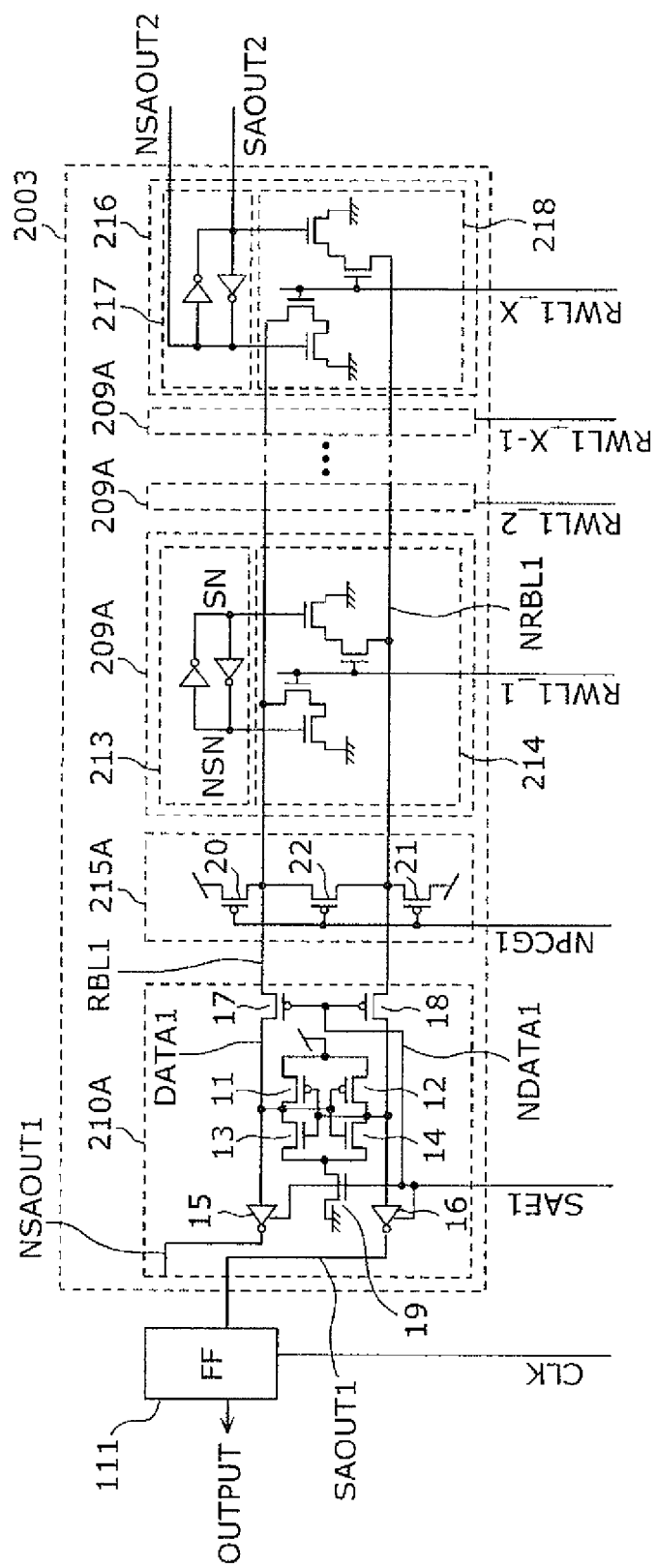
FIG. 8A is a circuit diagram illustrating in detail the configuration of the data transfer circuit according to the third exemplary embodiment.
Figure 8B:
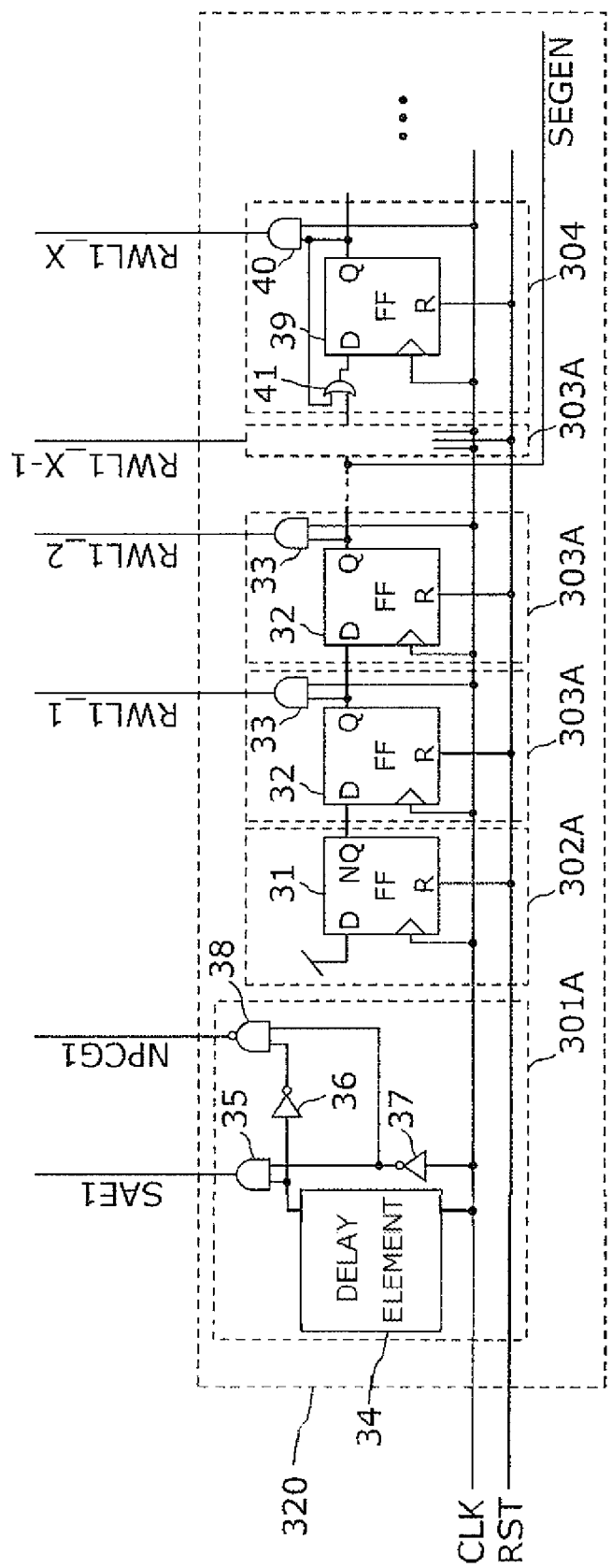
FIG. 8B is a circuit diagram illustrating in detail the configuration of the data transfer circuit according to the third exemplary embodiment.

FIGS. 8A and 8B are circuit diagrams illustrating in detail the configuration illustrated in FIG. 7.

The configurations of sense amplifier 210A, precharge circuit 215A, latch driver circuits 209A, intermediate latch circuit 217, and second segment 2002 are the same as those in the first and second exemplary embodiments. Further, sense amplifier precharge enable generation circuit 301A, start address generation circuit 302A, read word line signal generation circuits 303A and 303B, and intermediate read word line signal generation circuit 304, which compose column scanning circuit and timing signal generation circuit 320, are the same as those in the first and second exemplary embodiments, and intermediate sense amplifier precharge enable generation circuit 311B is the same as that in the second exemplary embodiment.

Further, the present exemplary embodiment is different from the first and second exemplary embodiments in that the pixel data of V1_X column is held in intermediate latch circuit 217.

Figure 9:
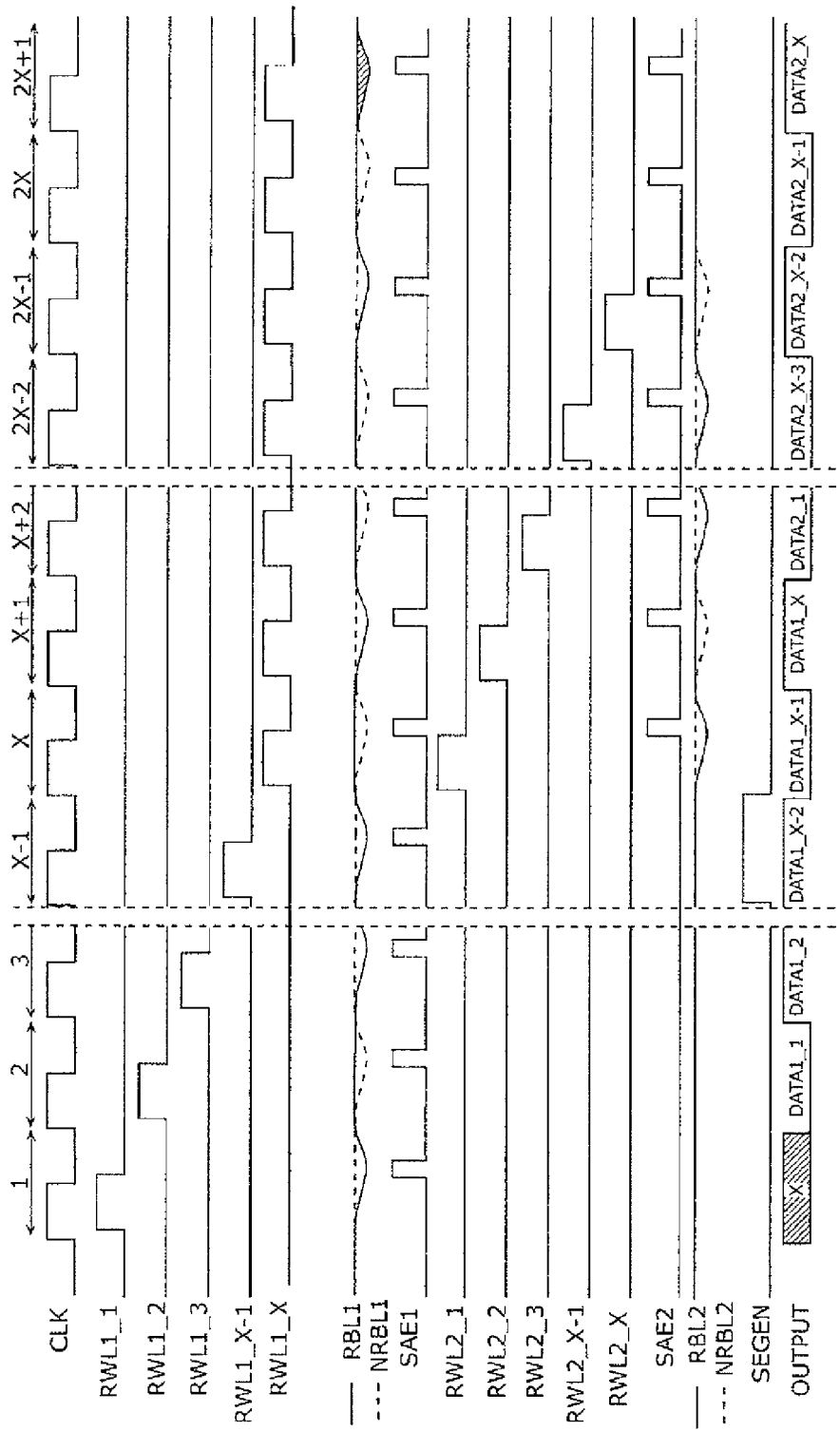
FIG. 9 is a timing chart illustrating an operation according to the third exemplary embodiment.

The operation will be described below with reference to the waveform chart in FIG. 9.

Note that, in the description below, storage node SN of each of latch circuits 213 corresponding to read word line RWL1_1 holds the L level, and storage node NSN thereof holds the H level (pixel data: L), as in the first exemplary embodiment. Storage node SN of each of latch circuits 213 corresponding to read word line RWL1_2 holds the H level, and storage node NSN thereof holds the L level (pixel data: H). Inverted data is stored in subsequent adjacent latch circuits 213 and intermediate latch circuit 217.

Similarly, storage node SN of each of latch circuits 213 corresponding to read word line RWL2_1 holds the L level, and storage node NSN thereof holds the H level (pixel data: L). Storage node SN of each of latch circuits 213 corresponding to read word line RWL2_2 holds the H level, and storage node NSN thereof holds the L level (pixel data: H). Inverted data is stored in subsequent adjacent latch circuits 213 and intermediate latch circuit 217.

The description will be given, on the assumption that X is an even number, as in the previous exemplary embodiments.

The reset operation before cycle 1 and the operations from cycle 1 to cycle X−1 are the same as those in the second exemplary embodiment. In each cycle, read word lines RWL1_1 to RWL1_X−1 are sequentially selected, the signal transmitted to read bit lines RBL1 and NRBL1 is amplified by sense amplifier 210A, the amplified signal is output to output terminal SAOUT1, and the output signal is output as output data OUTPUT through the flip-flop.

Since segment enable signal SEGEN is activated to the H level in cycle X, read word lines RWL1_X and RWL2_1 are simultaneously activated.

The H-level pixel data held in intermediate latch circuit 217 is transmitted to read bit lines RBL1 and NRBL1 at the same timing as the rising of read word line RWL1_X. This signal is output to output terminal SAOUT1 by the activation of sense amplifier enable signal SAE1 to the H level generated from the trailing edge of the clock.

Further, a Q output terminal of flip-flop 39 in intermediate read word line signal generation circuit 304 is connected to AND element 42 in intermediate sense amplifier precharge enable generation circuit 311B. With this, in this cycle X, sense amplifier enable signal SAE2 is activated only after reset signal RST is activated. In this cycle X, the data in latch circuits 213 corresponding to read word line RWL2_1 is transmitted to read bit lines RBL2 and NRBL2. Further, this data is written and held in intermediate latch circuit 217 by the activation of sense amplifier enable signal SAE2, which is generated from the trailing edge of the clock in cycle X, to the H level.

According to the above operation, the H-level pixel data which has been held in intermediate latch circuit 217 corresponding to read word line RWL1_X is output to output terminal SAOUT1 at the end of cycle X. In addition, the L-level pixel data held in latch circuits 213 corresponding to read word line RWL2_1 is held in intermediate latch circuit 217.

In cycle X+1, the H-level pixel data, which is output to output terminal SAOUT1 in the previous cycle, held in intermediate latch circuit 217 corresponding to read word line RWL1_X, and corresponds to V1_X, is firstly output through flip-flop circuit 111.

Since the Q output terminal of flip-flop 39 in intermediate read word line signal generation circuit 304 is activated in the previous cycle, the D input terminal is thereafter maintained at the H level by OR element 41. Accordingly, read word line RWL1_X is then activated according to clock signal CLK during the period before reset signal RST is activated.

The L-level pixel data which has been read in cycle X and held in latch circuits 213 corresponding to read word line RWL2_1 is held in intermediate latch circuit 217. The pixel data described above is output to output terminal SAOUT1 of sense amplifier 210A due to the activation of read word line RWL1_X and the activation of sense amplifier enable signal SAE1 as in the previous cycle.

Simultaneously, the H-level pixel data held in latch circuits 213 corresponding to read word line RWL2_2 is written and held in intermediate latch circuit 217 by sense amplifier 210B in second segment 2002, as in the previous cycle.

In the subsequent cycles, read word lines RWL2_3 to RWL2_X are sequentially activated, so that the pixel data is output as output data OUTPUT through sense amplifier 210B in second segment 2002, intermediate latch circuit 217, sense amplifier 210A in first segment 2003, and flip-flop circuit 111.

As described above, the number of the latch driver circuits included in first segment 2003 and second segment 2002 is equal to the number 2X of the pixels arrayed in the horizontal direction, and as many latch circuits 213 and intermediate latch circuit 217 as needed to hold pixel data are only provided. Compared to the previous exemplary embodiment including intermediate latch circuit 217 in addition to the same number of latch circuits 213 as the number 2X of pixels, the number of elements can be reduced in the present exemplary embodiment. Therefore, the area of the data transfer circuit can be reduced.

As described above, the second latch circuit (intermediate latch circuit 217) is provided so as to correspond to a third unit column (V1_X), and holds third pixel data obtained by converting an analog signal into a digital signal, the analog signal being generated from a pixel located on the third unit column out of the plurality of pixels. The second driver circuit (intermediate driver circuit 218) outputs the third pixel data held in the second latch circuit to the second read bit line (read bit lines RBL1 and NRBL1). The column scanning circuit (column scanning circuit and timing signal generation circuit 320) sequentially outputs a plurality of the second pixel data and the third pixel data, which correspond to the plurality of second unit columns (V1_1 to V1_X−1) and the third unit column (V1_X), to the second amplifier (sense amplifier 210A) through the second read bit line by sequentially selecting the plurality of third driver circuits (driver circuits 214 included in the plurality of latch driver circuits 209A) and the second driver circuit.

With this, a reading control using two read bit lines can be implemented by using the same number of latch circuits as the number of the unit columns, whereby a chip area can be reduced.

Fourth Exemplary Embodiment

Figure 10:
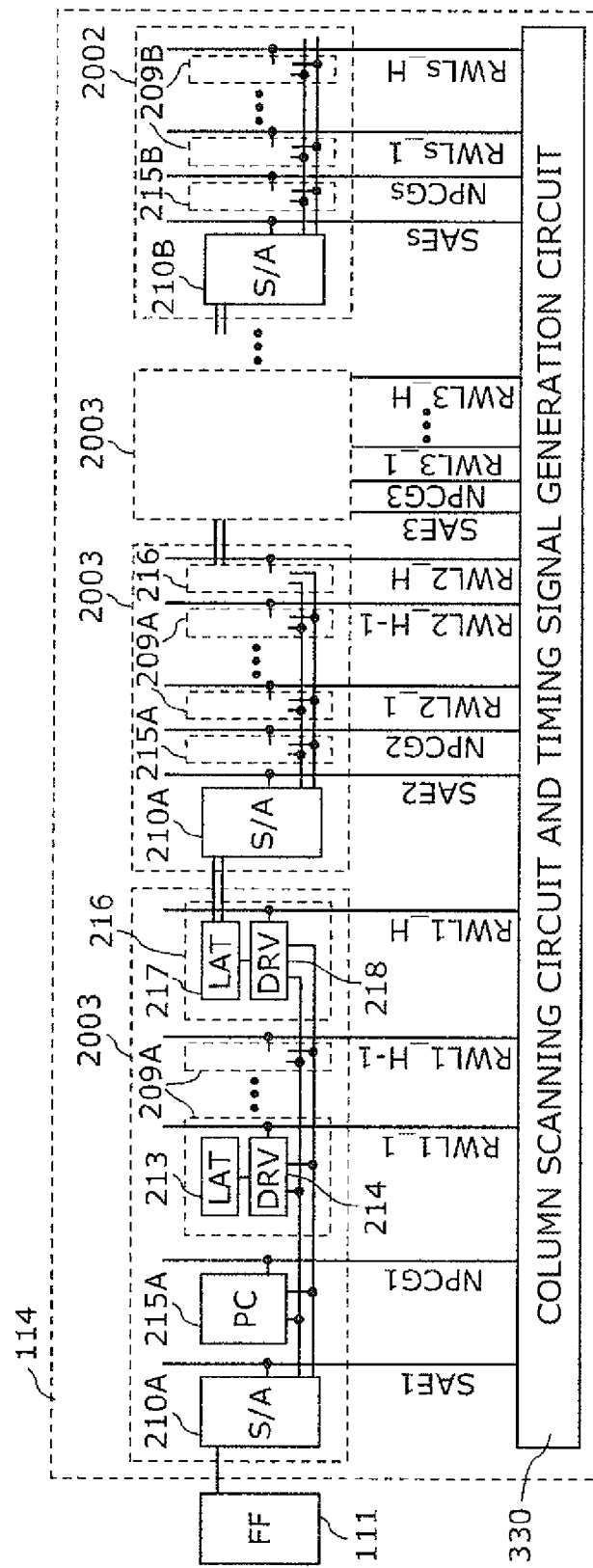
FIG. 10 is a block diagram illustrating a configuration of a data transfer circuit according to a fourth exemplary embodiment.

FIG. 10 is a diagram illustrating a configuration of data transfer circuit 114 according to a fourth exemplary embodiment. In FIG. 10, only the configuration corresponding to one bit is illustrated, as in FIG. 2. In the first to third exemplary embodiments, data transfer circuit 110 or 113 is divided into two, that is, divided into first segment 2001 or 2003 and second segment 2002. In the present exemplary embodiment, data transfer circuit 114 is divided into three or more segments.

In the present exemplary embodiment, data transfer circuit 114 is divided into s segments, and each segment has H latch circuits. Specifically, data transfer circuit 114 has a circuit structure for holding and reading pixel data in s×H columns.

Each of first segment 2003 to (s−1)th segment 2003 includes H latch circuits 213 and intermediate latch circuit 217. Further, sth segment 2002 includes H latch circuits 213.

The respective segments are connected in series. That is, sense amplifier 210A or 210B in one segment is connected to intermediate latch circuit 217 in the previous segment.

The operation is the same as that in the third exemplary embodiment, and data held in the latch circuits in second segment 2003 and subsequent segments is output as output data OUTPUT through two or more sense amplifiers 210A.

For example, the data in latch driver circuit 209A which is included in third segment 2003 and corresponds to read word line RWL3_1 is written and held in intermediate latch circuit 217 in intermediate latch driver circuit 216 in second segment 2003 in a certain cycle, written and held in intermediate latch circuit 217 in intermediate latch driver circuit 216 in first segment 2003 in the next cycle, read by sense amplifier 210A in segment 2003 in the next cycle, and output as output data OUTPUT in the next cycle. In this way, the data corresponding to read word line RWL3_1 is output.

The fourth exemplary embodiment is the same as the first to third exemplary embodiments in that the respective pixel data is sequentially read out.

With this configuration, the read bit lines driven by driver circuits 214 and intermediate driver circuits 218 become shorter than those in the first to third exemplary embodiments, whereby the signal transmission time can significantly be reduced. Thus, the frequency for reading can be significantly increased.

In other words, the number of division of segments can be set according to the frequency required for data reading.

In the present exemplary embodiment, the number of latch driver circuits 209A and the number of intermediate latch driver circuits 216 in each segment are equal to each other. However, even if these numbers are different from each other, the similar reading is enabled.

Note that intermediate latch circuits 217 may be provided independently of a pixel column as in the first or second exemplary embodiment, or may be shared by ordinary latch circuits 213 as in the third exemplary embodiment. Further, in the present exemplary embodiment, segment 2003 similar to that in the second exemplary embodiment is used for the first to (s−1)th segments. However, segment 2001 similar to that in the first exemplary embodiment may be used.

As described above, solid-state imaging device 1000 includes m (m is an integer equal to or larger than two) segments (first to (s−1)th segments 2003) associated with different unit column groups.

Each of the m segments includes the plurality of third latch circuits (latch circuits 213 included in a plurality of latch driver circuits 209A); the plurality of third driver circuits (driver circuits 214 included in a plurality of latch driver circuits 209A); the second read bit line (read bit lines RBL1 and NRBL1); the second latch circuit (intermediate latch circuit 217); the second driver circuit (intermediate driver circuit 218); and the second amplifier (sense amplifier 210A).

The second latch circuit included in the (j−1)-th (j is an arbitrary integer from two to m) segment holds the second data generated by the second amplifier included in the j-th segment. The second latch circuit included in the m-th segment holds the first data generated by the first amplifier (sense amplifier 210B). The output driver (flip-flop circuit 111) outputs the second data generated by the second amplifier included in the first segment.

The column scanning circuit (column scanning circuit and timing signal generation circuit 330) sequentially outputs the plurality of second pixel data corresponding to the first unit column group to the second amplifier included in the first segment through the second read bit line included in the first segment by sequentially selecting the plurality of third driver circuits included in the first segment. Further, the column scanning circuit sequentially outputs the plurality of second pixel data corresponding to the j-th unit column group to the second amplifier included in the first segment through a plurality of the second read bit lines included in the j-th to first segments by sequentially selecting the plurality of third driver circuits included in the j-th segment and selecting the second driver circuits included in the first to (j−1)-th segments. Further, the column scanning circuit sequentially outputs a plurality of the first pixel data corresponding to the plurality of first unit columns to the second amplifier included in the first segment through the first read bit line and a plurality of the second read bit lines included in the m-th to first segments by sequentially selecting the plurality of first driver circuits and selecting a plurality of the second driver circuits included in the first to m-th segments.

Thus, the solid-state imaging device uses three or more read bit lines, whereby the reading speed can further be increased.

In addition, the second amplifier included in the j-th segment may be activated only in a cycle in which any one of the plurality of third driver circuits and the second driver circuit included in the j-th segment is activated. In addition, the first amplifier (sense amplifier 210B) may be activated only in the cycle in which any one of the plurality of first driver circuits (the plurality of driver circuits 214 included in the plurality of latch driver circuits 209B) is activated.

Thus, the second amplifier and the first amplifier are activated only in a necessary period, whereby power consumption is reduced.

In addition, the second latch circuit included in each segment may be further provided so as to correspond to a third unit column (V1_H, V2_H, . . . , Vs−1_H) included in the corresponding unit column group, and hold third pixel data obtained by converting an analog signal into a digital signal, the analog signal being generated from a pixel located on the third unit column out of the plurality of pixels; the second driver circuit may output the third pixel data held in the second latch circuit to the second read bit line; and the column scanning circuit (1) may sequentially output the plurality of second pixel data corresponding to the first unit column group to the second amplifier included in the first segment through the second read bit line included in the first segment by sequentially selecting the plurality of third driver circuits and the second driver circuit included in the first segment, and (2) may sequentially output the plurality of second pixel data corresponding to the j-th unit column group to the second amplifier included in the first segment through a plurality of the second read bit lines included in the j-th to first segments by sequentially selecting the plurality of third driver circuits and the second driver circuit included in the j-th segment and selecting the second driver circuits included in the first to (j−1)-th segments.

With this, a reading control using three or more read bit lines can be implemented by using the same number of latch circuits as the number of the unit columns, whereby a chip area can be reduced.

Fifth Exemplary Embodiment

Figure 11:
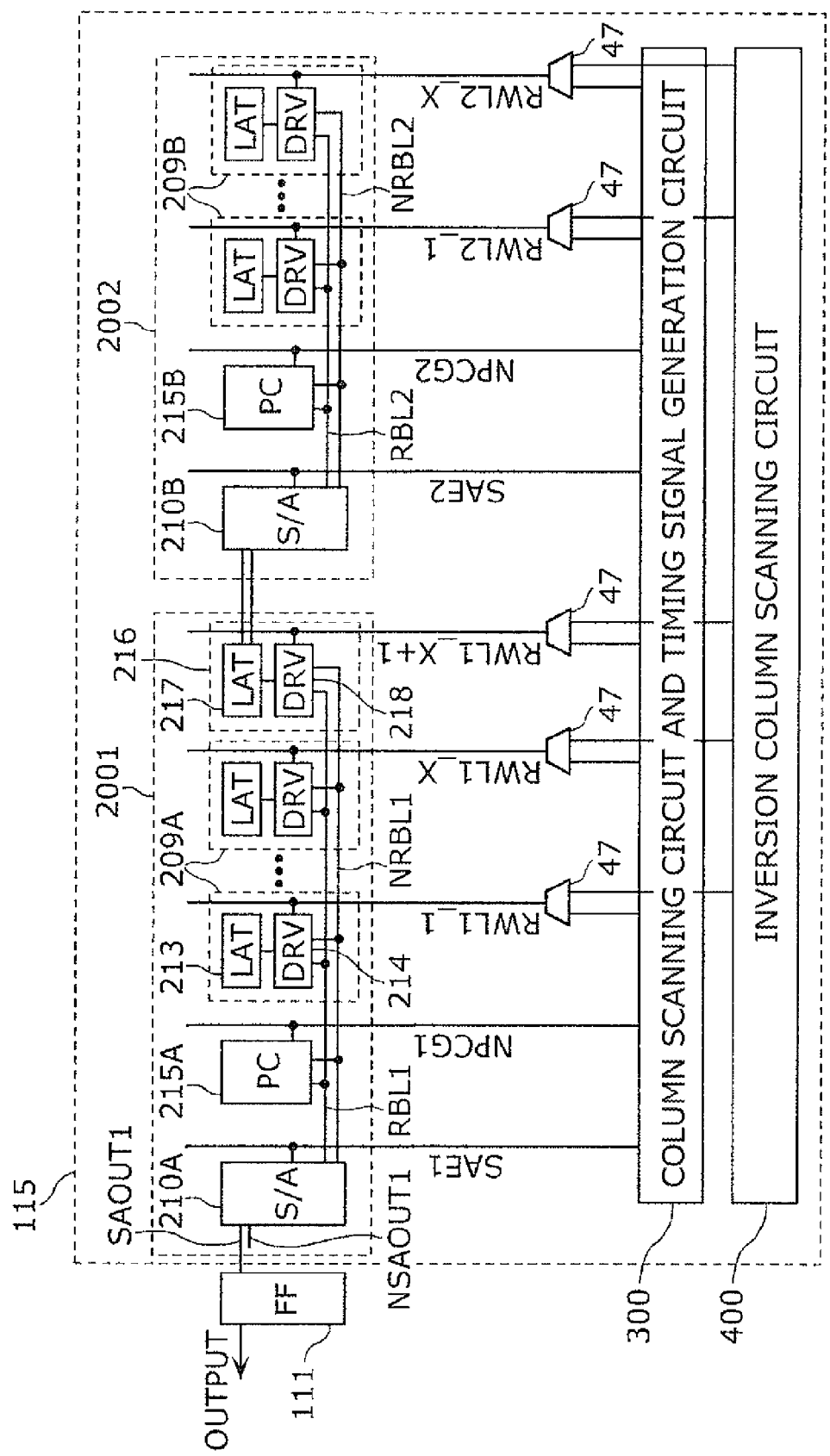
FIG. 11 is a block diagram illustrating a configuration of a data transfer circuit according to a fifth exemplary embodiment.

FIG. 11 is a diagram illustrating a configuration of data transfer circuit 115 according to a fifth exemplary embodiment. In FIG. 11, the configuration corresponding to one bit is only illustrated, as in FIG. 2. Data transfer circuit 115 illustrated in FIG. 11 includes inversion column scanning circuit 400 and selector circuit 47, in addition to the configuration illustrated in FIG. 2 according to the first exemplary embodiment.

The configuration of column scanning circuit and timing signal generation circuit 300 is the same as that illustrated in the first exemplary embodiment, and signals from read word lines RWL1_1 to RWL2_X are input to a plurality of selector circuits 47 illustrated in FIG. 11. Further, the connection relation between sense amplifier enable signals SAE1 and SAE2 and precharge signals NPCG1 and NPCG2 is the same as that in the first exemplary embodiment.

Figure 12:
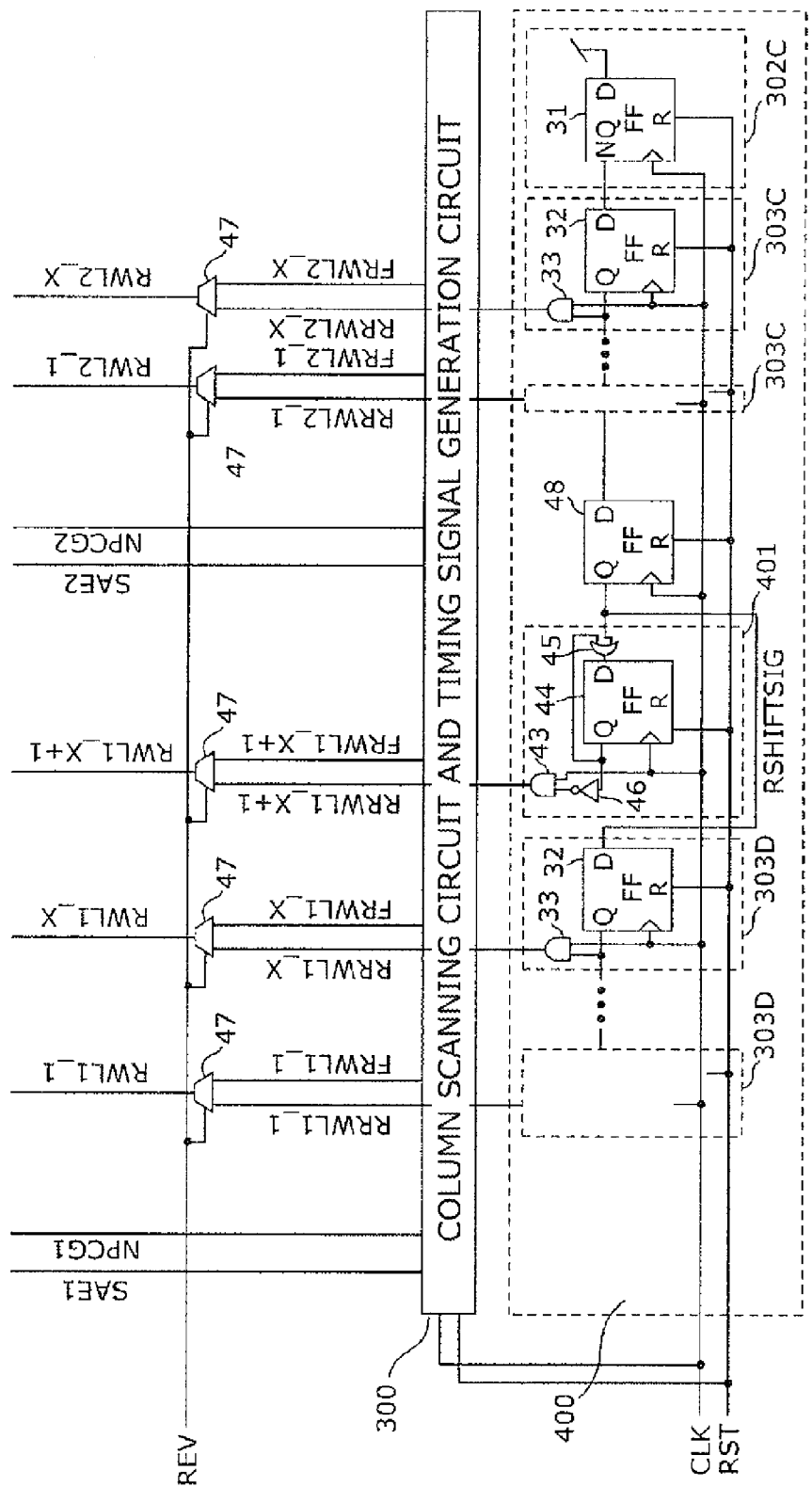
FIG. 12 is a circuit diagram illustrating in detail the configuration of the data transfer circuit according to the fifth exemplary embodiment.

FIG. 12 is a diagram illustrating the configuration of inversion column scanning circuit 400. Inversion column scanning circuit 400 includes start address generation circuit 302C, read word line signal generation circuits 303C and 303D, inversion operation intermediate read word line signal generation circuit 401, and flip-flop 48. The configurations of read word line signal generation circuits 303C and 303D are the same as the configurations of read word line signal generation circuits 303A and 303B described in the first exemplary embodiment.

Flip-flop 48 and flip-flops 32 included in read word line signal generation circuits 303C and 303D are connected in series, and function as shift registers.

Inversion operation intermediate read word line signal generation circuit 401 includes AND element 43, flip-flop 44, OR element 45, and inverter element 46. A Q input terminal of flip-flop 44 is connected to an input terminal of OR element 45 for loop holding. Thus, when the Q output terminal once becomes the H level, the Q output terminal is kept at the H level unless the reset operation is performed.

The plurality of selector circuits 47 selects either of a plurality of signals of read word lines FRWL1_1 to FRWL2_X output from column scanning circuit and timing signal generation circuit 300 or a plurality of signals of inversion scanning read word lines RRWL1_1 to RRWL2_X output from inversion column scanning circuit 400 according to inversion operation signal REV, and outputs the selected plurality of signals to read word lines RWL1_1 to RWL2X.

The case where the selector circuits 47 select the plurality of signals of inversion scanning read word lines RRWL1_1 to RRWL2_X will be described below.

Figure 13:
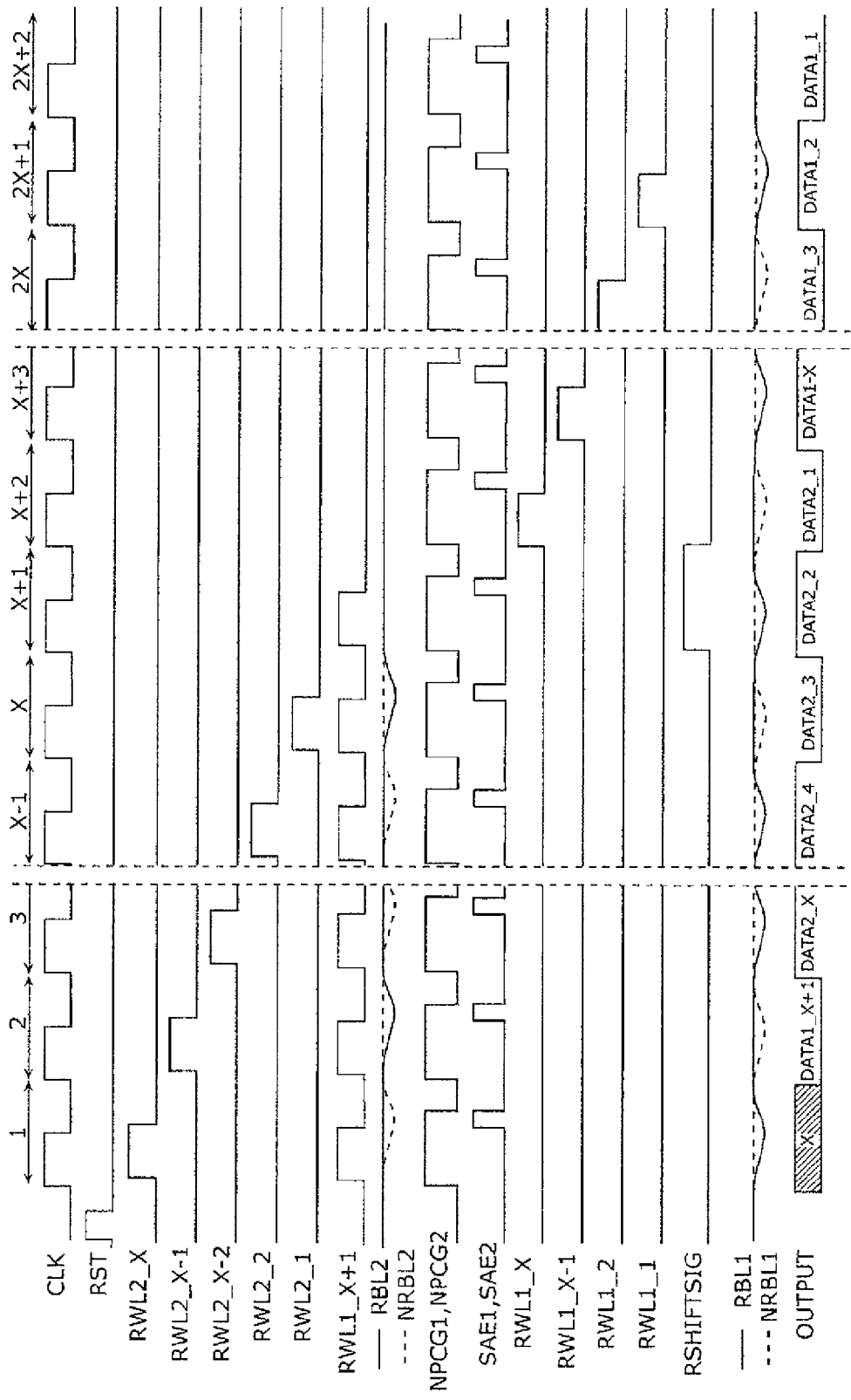
FIG. 13 is a timing chart illustrating an operation according to the fifth exemplary embodiment.

FIG. 13 is a diagram illustrating a signal waveform in this case.

For the sake of convenience of the description, cycle names from 1 to 2X+2 are attached on clock signal CLK, as in the first exemplary embodiment. In the present description, X is an even number.

Further, in the description below, storage node SN of each of latch circuits 213 corresponding to read word line RWL1_1 holds the L level, and storage node NSN thereof holds the H level (pixel data: L). Storage node SN of each of latch circuits 213 corresponding to read word line RWL1_2 holds the H level, and storage node NSN thereof holds the L level (pixel data: H). Inverted data is stored in subsequent adjacent latch circuits 213.

Similarly, storage node SN of each of latch circuits 213 corresponding to read word line RWL2_1 holds the L level, and storage node NSN thereof holds the H level (pixel data: L). Storage node SN of each of latch circuits 213 corresponding to read word line RWL2_2 holds the H level, and storage node NSN thereof holds the L level (pixel data: H). Inverted data is stored in subsequent adjacent latch circuits 213.

Further, in an initial state of intermediate latch circuit 217, storage node SN holds the L level, and storage node NSN holds the H level (pixel data: L).

Before cycle 1, reset signal RST is activated for initializing the inside of inversion column scanning circuit 400. With this, flip-flops 31, 32, 44, and 48 are initialized.

Thus, the D input terminal of flip-flop 32 in read word line signal generation circuit 303C corresponding to read word line RRWL2_X is set to the H level.

Further, since clock signal CLK is in the L level before cycle 1, precharge signals NPCG1 and NPCG2 are activated to the L level by sense amplifier precharge enable generation circuits 301A and 301B in column scanning circuit and timing signal generation circuit 300. Thus, read bit lines RBL1, NRBL1, RBL2, and NRBL2 are precharged to the H level by precharge circuits 215A and 215B. At that time, sense amplifier enable signals SAE1 and SAE2 are in the deactivated state that is the L level.

When clock signal CLK rises to the H level in cycle 1, precharge signals NPCG1 and NPCG2 become the H level. With this, precharge circuits 215A and 215B are deactivated, whereby the precharge operation is canceled.

Further, the Q output terminal of flip-flop 44 in inversion operation intermediate read word line signal generation circuit 401 corresponding to read word line RWL1_X+1 is in the L level. Therefore, simultaneous with this, read word line RWL1_X+1 is activated through AND element 43 at the leading edge of clock signal CLK to the H level.

Simultaneously, the Q output terminal of flip-flop 32 in read word line signal generation circuit 303C corresponding to read word line RWL2_X is also activated to the H level at the leading edge of clock signal CLK to the H level. Thus, read word line RWL2_X is activated through AND element 33. Further, read word lines RWL1_X+1 and RWL2_X become the H level during a period which is a half of the clock cycle.

Then, when read word line RWL1_X+1 is activated to the H level, driver circuit 218 is activated. As described above, the data in intermediate latch circuit 217 is L data. Therefore, the voltage of read bit line RBL1 which has been precharged transfers to a level lower than the power supply voltage.

Since Pch transistors 17 and 18 in sense amplifier 210A in first segment 2001 are in the activated state, the voltage of data line DATA1 transfers to a level lower than the power supply voltage, as in read bit line RBL1. On the other hand, the level of the voltage of read bit line NRBL1 which has been precharged is maintained.

Simultaneously, the data in latch circuits 213 read by the activation operation of read word line RWL2_X is H data as described above, and therefore, when read word line RWL2_X is activated to the H level, driver circuits 214 are activated, whereby the voltage of read bit line NRBL2 which has been precharged transfers to a level lower than the power supply voltage.

Since Pch transistors 17 and 18 in sense amplifier 210B in second segment 2002 are in the activated state, the voltage of data line NDATA2 transfers to a level lower than the power supply voltage, as in read bit line NRBL2. On the other hand, the level of the voltage of read bit line RBL2 which has been precharged is maintained.

When clock signal CLK drops to the L level in the same cycle, sense amplifier precharge enable generation circuit 301A activates sense amplifier enable signal SAE1 to the H level. At that time, the voltage of data line DATA1 is lower than the voltage of data line NDATA1, so that the voltage of data line DATA1 drops to the L level (sense operation).

Simultaneously, tri-state inverters 15 and 16 are activated, whereby output terminal SAOUT1 drops to the L level.

Simultaneously, sense amplifier precharge enable generation circuit 301B activates sense amplifier enable signal SAE2 to the H level. At that time, the voltage of data line NDATA2 is lower than the voltage of data line DATA2, so that the voltage of data line NDATA1 drops to the L level (sense operation).

Simultaneously, tri-state inverters 15 and 16 are activated, whereby output terminal SAOUT2 becomes the H level and output terminal NSAOUT2 becomes the L level.

With this operation, the pixel data held in latch circuits 213 corresponding to read word line RWL2_X is written and held in intermediate latch circuit 217. Reading of data from intermediate latch circuit 217 is performed during the period in which clock signal CLK is in the H level, and writing of pixel data to latch circuits 213 is performed during a certain period after clock signal CLK transfers to the L level. Therefore, the operation of writing data to latch circuits 213 does not interfere with the operation of reading data from intermediate latch circuit 217 in the same cycle.

When clock signal CLK transfers to the H level in cycle 2, flip-flop circuit 111 retrieves the data of output terminal SAOUT1 of sense amplifier 210A, and outputs the L-level data in intermediate latch circuit 217 corresponding to read word line RWL1_X+1 as output data OUTPUT. Note that, for the sake of convenience of the description, DATA1_X+1 indicating the data corresponding to read word line RWL1_X+1 is written on the waveform of output data OUTPUT. Note that DATA1_X+1 is not pixel data, but an initial value of intermediate latch circuit 217.

The operation in cycle 2 is similar to the operation in cycle 1, except that read word lines to be activated are read word lines RWL1_X+1 and RWL2_X−1.

In cycle 2, the H-level data same as those in latch circuits 213 corresponding to read word line RWL2_X is written in intermediate latch circuit 217. Therefore, in first segment 2001, the operation of reading the H-level pixel data through read bit lines RBL1 and NRBL1 is performed. On the other hand, in second segment 2002, the operation of writing the L-level pixel data in latch circuits 213 corresponding to read word line RWL2_X−1 into intermediate latch circuit 217 through read bit lines RBL2 and NRBL2 and sense amplifier 210B in second segment 2002 is performed. The data in latch circuits 213 corresponding to read word line RWL2_X−1 is output to output terminal SAOUT1 through read bit lines RBL1 and NRBL1 and sense amplifier 210A in first segment 2001 in cycle 3. Then, in cycle 4, DATA2_X−1 is output as output data OUTPUT.

Thereafter, the read word lines are sequentially scanned and the reading operation is performed.

The operation in cycle X is similar to the operation in cycle 1, except that the read word lines to be activated are read word lines RWL1_X+1 and RWL2_1.

In cycle X, the H-level data same as those in latch circuits 213 corresponding to read word line RWL2_2 is written in intermediate latch circuit 217. Therefore, in first segment 2001, the operation of reading the H-level data through read bit lines RBL1 and NRBL1 is performed.

In the operation in cycle X+1, only read word line RWL1_X+1 is activated. In previous cycle X, the operation of reading the data in latch circuits 213 corresponding to read word line RWL2_1 to output terminal SAOUT1 through read bit lines RBL1 and NRBL1 is performed. In this cycle, flip-flop 48 in inversion column scanning circuit 400 retrieves the H-level signal at the D input terminal by the signal which is sequentially shifted for every clock signal CLK from read word line signal generation circuit 303C. Specifically, the Q output terminal (RSHIFTSIG) becomes the H level after clock signal CLK transfers to the H level. Further, data (DATA2_2), which has been read in the second previous cycle, in latch circuits 213 corresponding to read word line RWL2_2 is output as output data OUTPUT.

In the operation in cycle X+2, since RSHIFTSIG is in the H level at the timing at which clock signal CLK transfers to the H level, an H-level signal is input to the D input terminal of flip-flop 44 in inversion operation intermediate read word line signal generation circuit 401. In addition, this signal is input to AND element 43 through inverter element 46. That is, an L-level signal is input to AND element 43. Therefore, AND element 43 performs an operation of gating clock signal CLK, so that read word line RWL1_X+1 is deactivated. On the other hand, flip-flop 32 in read word line signal generation circuit 303D corresponding to read word line RRWL1_X retrieves the H-level signal at the D input terminal. Thus, read word lines RRWL1_X and RWL1_X are activated through AND element 33 in the same circuit.

Since read word line RWL1_X is activated, the H-level pixel data in latch circuits 213 corresponding to read word line RWL1_X is output to output terminal SAOUT1 through read bit lines RBL1 and NRBL1 and sense amplifier 210A in first segment 2001. Then, in cycle X+3, DATA1_X is output as output data OUTPUT.

Thereafter, clock signal CLK is continuously input until cycle 2X+2, whereby all pixel data up to DATA1_1 is output.

As described above, while the first to fourth exemplary embodiments use a method in which data is sequentially read from a pixel column closer to the output terminal to which output data OUTPUT is output, the direction of scanning data can arbitrarily be selected with inversion operation signal REV in the present exemplary embodiment. Specifically, in the present exemplary embodiment, the method in which data is sequentially read from a pixel column closer to the output terminal to which output data OUTPUT is output and the method in which data is sequentially read from a pixel column away from the output terminal can be selected.

These functions may be required depending on the combination of a solid-state imaging device and an image signal process LSI. In such a case, a scanning direction can arbitrarily be selected by applying this configuration. As described above, the column scanning circuit (column scanning circuit and timing signal generation circuit 300) sequentially outputs the plurality of second pixel data and the plurality of first pixel data to the second amplifier in the order from the pixel data of a unit column closer to the output driver (flip-flop circuit 111) to the pixel data of a unit column away from the output driver by sequentially selecting the plurality of third driver circuits and the plurality of first driver circuits (the plurality of driver circuits 214) in a forward direction.

Solid-state imaging device 1000 further includes inversion column scanning circuit 400 that sequentially outputs the plurality of second pixel data and the plurality of first pixel data to the second amplifier in the order from the pixel data of a unit column away from the output driver to the pixel data of a unit column closer to the output driver by sequentially selecting the plurality of third driver circuits and the plurality of first driver circuits in an opposite direction to the forward direction.

With this configuration, the solid-state imaging device can scan the plurality of unit columns in the forward direction and in the opposite direction.

Sixth Exemplary Embodiment

Figure 14:
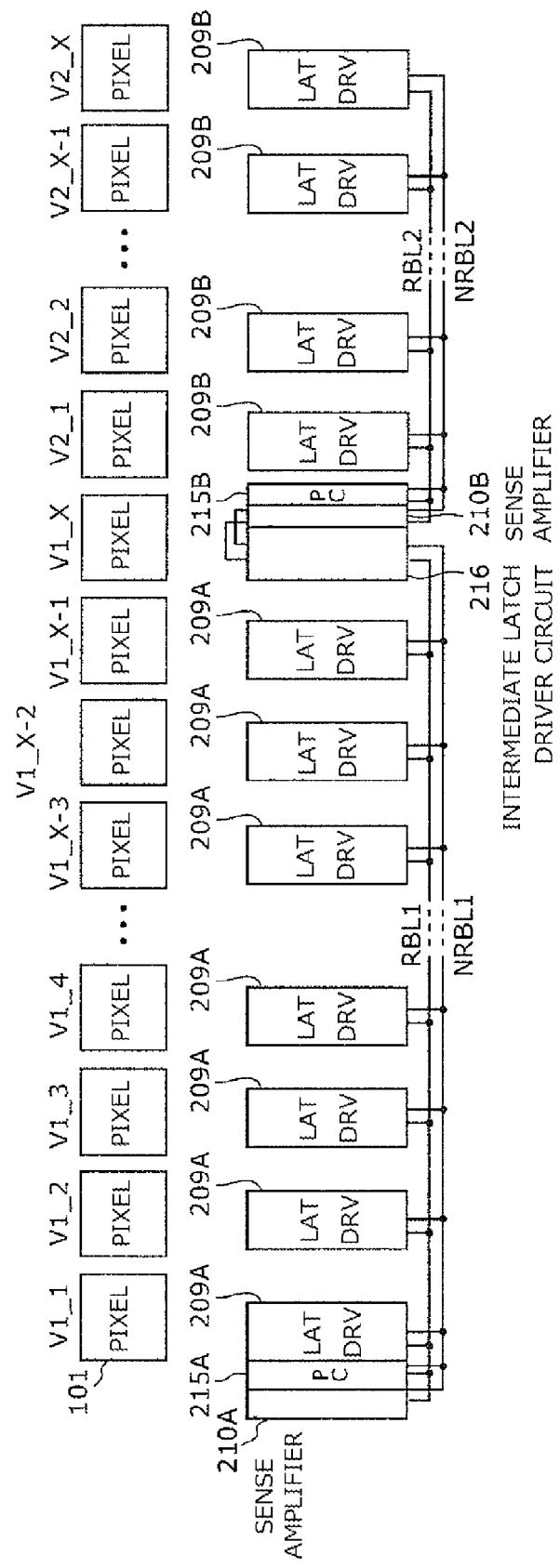
FIG. 14 is a diagram illustrating an arrangement example of each circuit according to a sixth exemplary embodiment.
Figure 15:
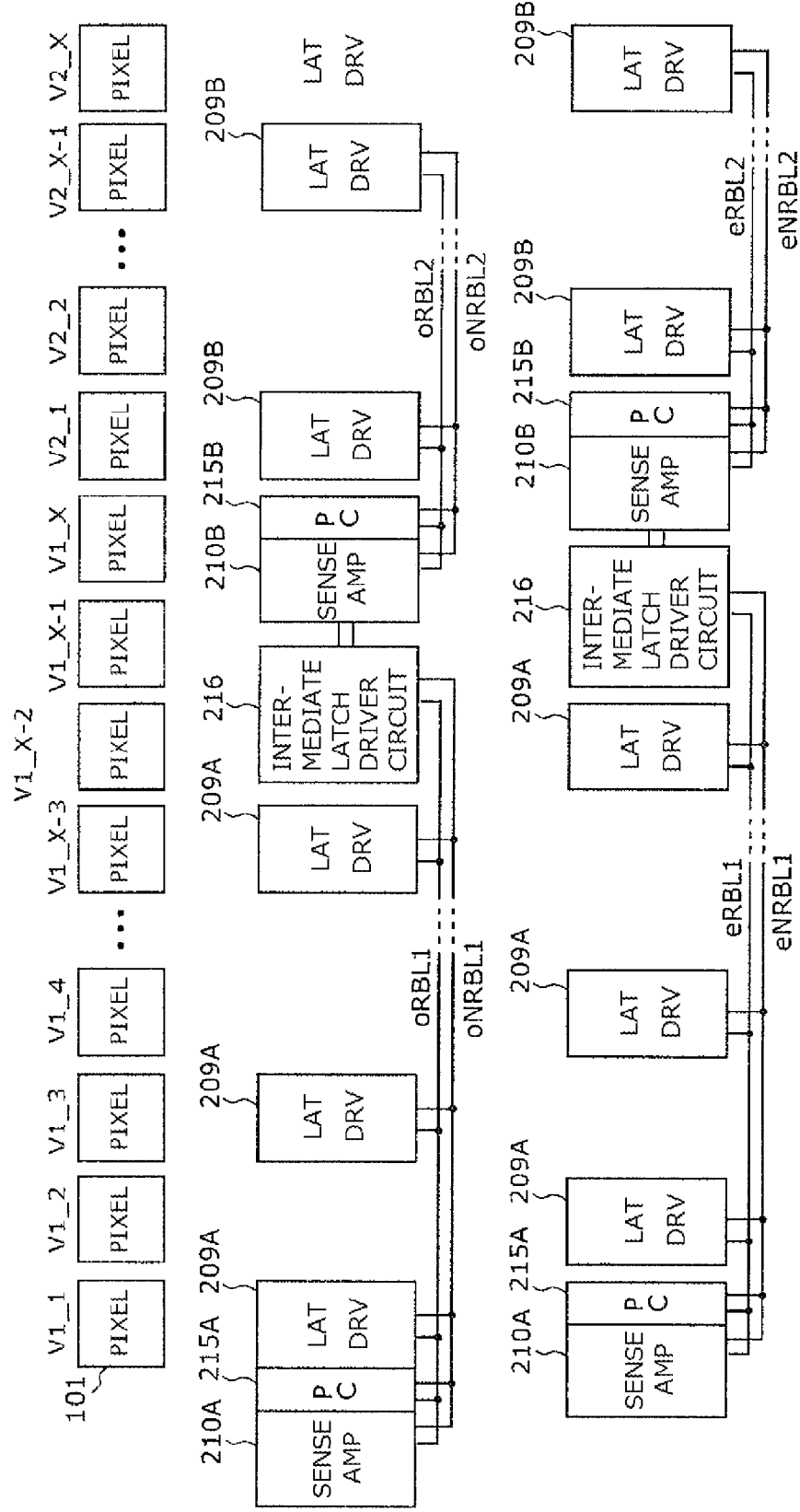
FIG. 15 is a diagram illustrating an arrangement example of each circuit according to the sixth exemplary embodiment.

FIGS. 14 and 15 are diagrams illustrating the arrangement state of pixels (unit cells 101), latch driver circuits 209A and 209B, intermediate latch driver circuit 216, sense amplifiers 210A and 210B, and precharge circuits 215A and 215B according to the present exemplary embodiment.

For example, in the third exemplary embodiment, the number of the pixel columns is equal to the number of the latch driver circuits and the intermediate latch driver circuits.

FIG. 14 illustrates the case in which latch driver circuits 209A and 209B and intermediate latch circuit 216 can be laid out in a region narrower than the width of unit cell 101. Specifically, a space is present between the adjacent latch driver circuits 209A and 209B and between latch driver circuit 209A or 209B and intermediate latch driver circuit 216. In this case, sense amplifier 210B and precharge circuit 215B are disposed between intermediate latch driver circuit 216 corresponding to the pixel on column V1_X and latch driver circuit 209B corresponding to the pixel on column V2_1.

According to this arrangement, latch driver circuits 209A and 209B and intermediate latch driver circuit 216 can be disposed with a pitch equal to a pitch of the pixels, whereby routing of additional wiring and non-uniformity of wiring in latch driver circuits in each column caused by the mismatch between the pitch of pixels and the pitch of latch driver circuits 209A and 209B and intermediate latch driver circuit 216 can be reduced.

Further, FIG. 15 illustrates a layout example in which the widths of latch driver circuits 209A and 209B and intermediate latch driver circuit 216 are equal to the width of the pixel.

In this case, two sets of latch driver circuits 209A and 209B, intermediate latch driver circuit 216, sense amplifiers 210A and 210B, and precharge circuits 215A and 215B are disposed. These two sets of circuits are disposed on different rows.

Latch driver circuits 209A and 209B included in the first set are disposed so as to correspond to the pixels on the odd columns. These latch driver circuits 209A and 209B are connected to read bit lines oRBL1, oNRBL1, oRBL2, and oNRBL2, and pixel data on the odd columns is read through read bit lines oRBL1, oNRBL1, oRBL2, and oNRBL2.

Similarly, latch driver circuits 209A and 209B included in the second set are disposed so as to correspond to the pixels on the even columns. These latch driver circuits 209A and 209B are connected to read bit lines eRBL1, eNRBL1, eRBL2, and eNRBL2, and pixel data on the even columns is read through read bit lines eRBL1, eNRBL1, eRBL2, and eNRBL2. Further, pixel data on even columns and odd columns can simultaneously be read according to this configuration.

With the arrangement described above, spaces for arranging sense amplifiers 210A and 210B and precharge circuits 215A and 215B can be ensured between adjacent latch driver circuits 209A and 209B or between latch driver circuit 209A or 209B and intermediate latch driver circuit 216.

Further, according to this arrangement, latch driver circuits 209A and 209B and intermediate latch driver circuit 216 can be disposed with a pitch twice a pitch of the pixels, whereby routing of additional wiring and non-uniformity of wiring in latch driver circuits in each column caused by the mismatch between the pitch of pixels and the pitch of latch driver circuits 209A and 209B and intermediate latch driver circuit 216 can be reduced.

Note that, while FIG. 15 illustrates the case in which two sets of circuit groups, each corresponding to the pixels on the odd columns and the pixels on the even columns, are used, three or more sets of circuit groups may be used to perform parallel reading of three or more parallel columns.

For example, in the case where sense amplifiers 210A and 210B and precharge circuits 215A and 215B have a large width, and they cannot be laid out in a region corresponding to the width of a pixel, the configuration of enabling parallel reading of three or more parallel columns may be used. With this, latch driver circuits 209A and 209B and intermediate latch driver circuit 216 can be disposed at equal pitches.

It is to be noted that, while the latch driver circuits are disposed for each pixel column in the above description, latch driver circuits may be provided for each of unit columns including one or more columns. Further, the unit column may be a unit corresponding to ½ column. In this case, the width of a pixel and the pitch of a pixel may be replaced by the width of a unit column and the pitch of a unit column.

As described above, as illustrated in FIG. 14, the plurality of third driver circuits (driver circuits 214 included in the plurality of latch driver circuits 209A), the plurality of first driver circuits (driver circuits 214 included in the plurality of latch driver circuits 209B), and the second driver circuit (intermediate driver circuit 218 included in intermediate latch driver circuit 216) are disposed at a pitch equal to a pitch of the unit columns. The first amplifier (sense amplifier 210B) is disposed in a region between a region where the plurality of third driver circuits are disposed and a region where the plurality of first driver circuits are disposed.

With this, the plurality of third driver circuits, the plurality of first driver circuits, and the second driver circuit are disposed at equal pitches. Thus, characteristic variation of each driver circuit caused by non-uniformity of a layout can be reduced.

Further, as illustrated in FIG. 15, solid-state imaging device 1000 may include a first circuit group (the upper circuit group in FIG. 15) and a second circuit group (the lower circuit group in FIG. 15).

Each of the first circuit group and the second circuit group includes the plurality of third latch circuits, the plurality of third driver circuits, the second read bit line, the second amplifier, the plurality of first latch circuits, the first read bit line, the plurality of first driver circuits, the first amplifier, the second latch circuit, and the second driver circuit.

The plurality of second unit columns and first unit columns corresponding to the first circuit group are a plurality of fourth unit columns (for example, odd columns) disposed at an interval of N (N is an integer equal to or larger than two) unit columns, and the plurality of second unit columns and first unit columns corresponding to the second circuit group are fifth unit columns U (for example, even columns) which are disposed at the interval of the N unit columns, the fifth unit columns U being different from the plurality of fourth unit columns.

The first circuit group and the second circuit group are aligned in a direction (vertical direction in FIG. 15) orthogonal to the arrangement direction of columns.

In each of the first circuit group and the second circuit group, (1) the plurality of third driver circuits, the plurality of first driver circuits, and the second driver circuit are disposed at a pitch N times the pitch of unit columns, and (2) the first amplifier is disposed in a region between a region where the plurality of third driver circuits are disposed and a region where the plurality of first driver circuits are disposed.

With this configuration, even if the width of the layout of each driver circuit is wider than the width of the layout of the pixel on the unit column, the plurality of third driver circuits, the plurality of first driver circuits, and the second driver circuit are disposed at equal pitches. Thus, characteristic variation of each driver circuit caused by non-uniformity of a layout can be reduced. Further, parallel reading of pixel data can be enabled.

Seventh Exemplary Embodiment

Figure 16:
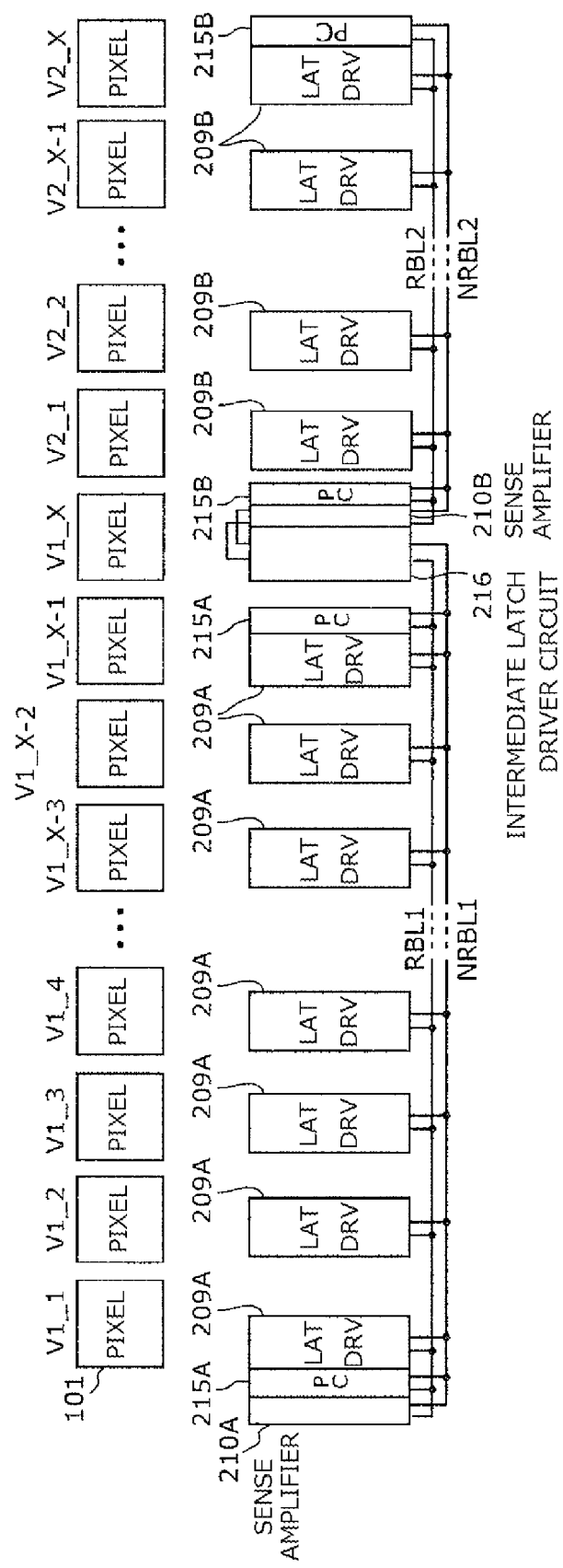
FIG. 16 is a diagram illustrating an arrangement example of each circuit according to a seventh exemplary embodiment.
Figure 17:
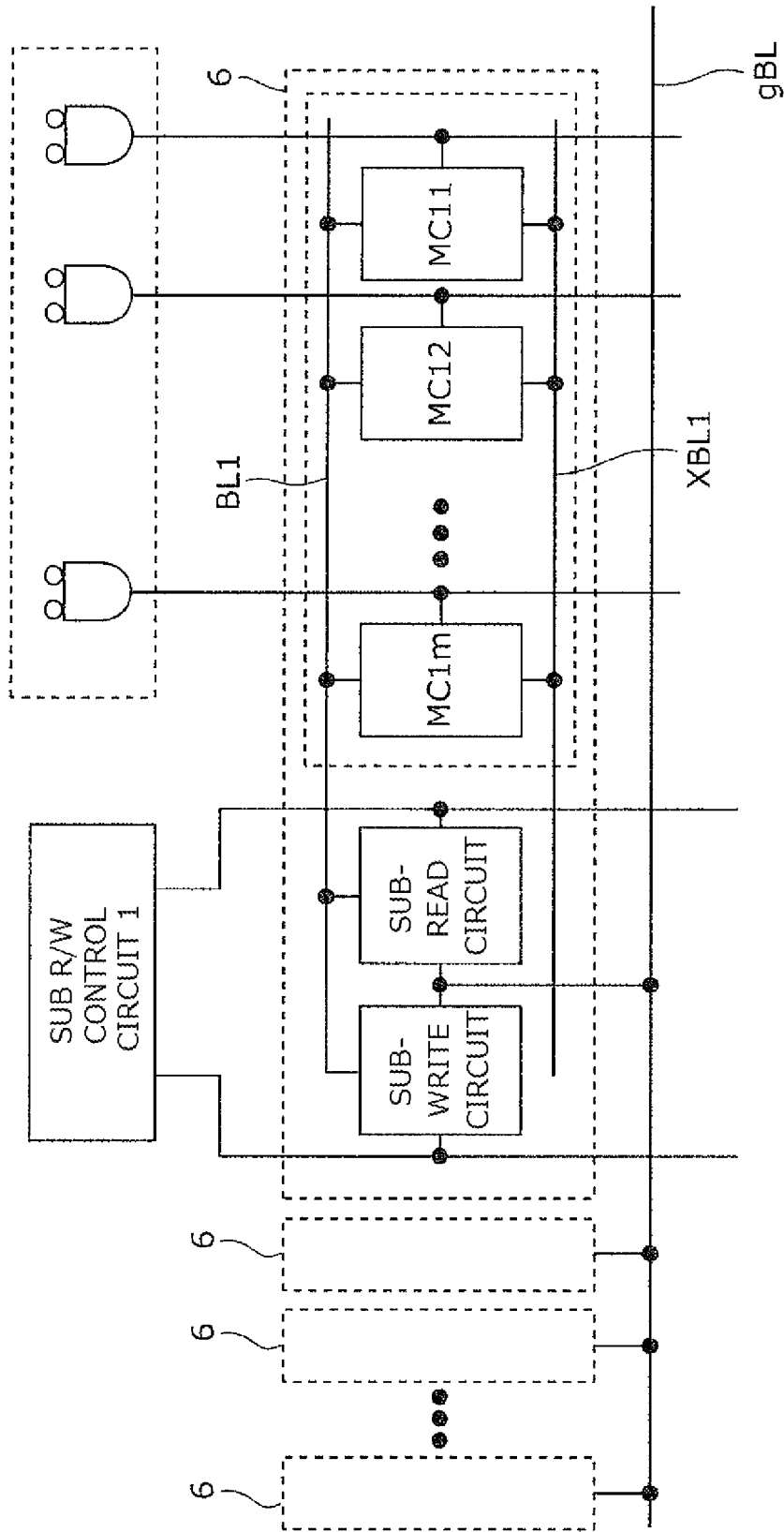
FIG. 17 is a diagram illustrating a configuration of a data transfer circuit according to a conventional technique.

FIG. 16 is a diagram illustrating the arrangement state of pixels, latch driver circuits 209A and 209B, intermediate latch driver circuit 216, sense amplifiers 210A and 210B, and precharge circuits 215A and 215B according to a seventh exemplary embodiment.

The configuration illustrated in FIG. 16 is different from the configuration illustrated in FIG. 14 according to the sixth exemplary embodiment in that two precharge circuits 215A are disposed with respect to read bit lines RBL1 and NRBL1, and two precharge circuits 215B are disposed with respect to read bit lines RBL2 and NRBL2. Further, in the case where latch driver circuits 209A and 209B and intermediate latch driver circuit 216 can be laid out in a region narrower than the width of the pixel as described above, precharge circuits 215A and 215B are disposed between latch driver circuits 209A and 209B and intermediate latch driver circuit 216.

With the configuration in which the precharge circuits are dispersively disposed as described above, the time taken to precharge read bit lines RBL1, NRBL1, RBL2, and NRBL2 can be reduced, whereby the operation at higher speed can be enabled.

As described above, solid-state imaging device 1000 described above may further include one or more first precharge circuits (precharge circuits 215A) that are connected to the second read bit line and disposed between the two adjacent third driver circuits or between the third driver circuit and the second driver circuit which are adjacent to each other, and one or more second precharge circuits (precharge circuits 215B) that are connected to the first read bit line and disposed between the two adjacent first driver circuits or between the first driver circuit and the second driver circuit which are adjacent to each other.

With this, even if the precharge circuit is used, the plurality of third driver circuits, the plurality of first driver circuits, and the second driver circuit are disposed at equal pitches. Thus, characteristic variation of each driver circuit caused by non-uniformity of a layout can be reduced.

While the solid-state imaging devices according to the exemplary embodiments of the present disclosure have been described above, the present disclosure is not limited to these embodiments.

Further, the solid-state imaging device or each processor included in the imaging device according to the above exemplary embodiments is typically implemented as an LSI which is an integrated circuit. They may be individually implemented by one chip, or a part or whole thereof may be implemented by one chip.

The implementation in the form of an integrated circuit is not limited to use an LSI. It may be implemented by a dedicated circuit or a general-purpose processor. Further, a Field Programmable Gate Array (FPGA) which is programmable after the manufacture of an LSI or a configurable processor which can reconfigure the connection or setting of a circuit cell in an LSI may be used.

In addition, the solid-state imaging device or a part of the functions of the imaging device according to the above exemplary embodiments may be implemented by the execution of a program by a processor such as a CPU.

Moreover, the present disclosure may be the program described above, or a non-transitory computer-readable recording medium on which the program is recorded. Further, it is obvious that the program can be distributed through a transfer medium such as the Internet.

Further, the circuit configurations illustrated in the above circuit diagrams are only illustrative, and the present disclosure is not limited to the above circuit configurations. That is, a circuit that can implement the characteristic functions of the present disclosure as in the above circuit configuration is also included in the present disclosure. For example, the present disclosure also includes a circuit in which a switching element (transistor), a resistance element, or an element such as a capacitance element are connected to a certain element in series or in parallel within the range in which the functions similar to the functions of the above circuit configurations can be implemented. In other words, the wording "connected" in the above exemplary embodiments is not limited to the case in which two terminals (nodes) are directly connected to each other. It includes the case in which the two terminals (nodes) are connected through an element within a range in which the similar functions can be implemented.

Further, all of the numerals used in the above description are only illustrative to specifically describe the present disclosure, and the present disclosure is not limited to the illustrated numerals. In addition, a logical level represented by high/low and a switching state represented by on/off are only illustrated to specifically describe the present disclosure, and an equivalent result can be obtained by different combinations of the illustrated logical levels or switching states. Further, the configuration of the logical circuit described above is only illustrated to specifically describe the present disclosure, and an equivalent input/output relation can be implemented by a logical circuit having a different configuration. In addition, an n-type and p-type of a transistor or the like are only illustrated to specifically describe the present disclosure, and an equivalent result can be obtained by inverting these types. In addition, the connection relations between components are only illustrated to specifically describe the present disclosure, and the connection relations that implement the functions of the present disclosure are not limited thereto.

Further, the divisional way of the functional blocks in the block diagrams is only illustrative, and a plurality of functional blocks may be implemented by one functional block, one functional block may be divided into a plurality of blocks, or some functions may be transferred to another functional block. In addition, the functions of the plurality of functional blocks having similar functions may be processed in parallel or in a time division manner by single hardware or software.

In addition, the case using a MOS transistor has been described above as one example. However, other transistors such as a bipolar transistor may be used.

While the solid-state imaging devices according to one or more aspects have been described above with reference to the exemplary embodiments, the present disclosure is not limited to these exemplary embodiments. However, an embodiment implemented by performing various modifications, which could be conceived of by a person skilled in the art, to the present exemplary embodiments or an embodiment made by combining the components in different exemplary embodiments are included in the scope of one or more aspects without departing from the gist of the present disclosure.

The present disclosure enables a significant reduction in a signal transmission time for reading pixel data with less power. Thus, the present disclosure provides effects of enhancing or maintaining a frame rate and of being capable of increasing the number of pixels or an optical size of pixels. Accordingly, the present disclosure is useful for a high-speed and high-quality solid-state imaging device and an imaging device.

What is claimed is:

1. A solid-state imaging device comprising:
   a plurality of pixels arrayed in a matrix;
   a plurality of first latch circuits, each of which is provided so as to correspond to a different one of a plurality of first unit columns and holds first pixel data obtained by converting an analog signal into a digital signal, the analog signal being generated from a pixel located on a corresponding one of the first unit columns out of the plurality of pixels;
   a first read bit line;
   a plurality of first driver circuits, each of which is provided so as to correspond to a different one of the plurality of first unit columns and outputs the first pixel data to the first read bit line, the first pixel data being held in a corresponding one of the first latch circuits;
   a first amplifier that amplifies a voltage of the first read bit line to generate first data;
   a second latch circuit that holds the first data;
   a second driver circuit; and
   a column scanning circuit,
   wherein the column scanning circuit sequentially outputs a plurality of the first pixel data corresponding to the plurality of first unit columns by sequentially selecting the plurality of first driver circuits and selecting the second driver circuit, and
   the second driver circuit outputs the first data held in the second latch circuit to a read bit line different from the first read bit line.

2. The solid-state imaging device according to claim 1, comprising:
   a plurality of third latch circuits, each of which is provided so as to correspond to a different one of a plurality of second unit columns different from the plurality of first unit columns, and holds second pixel data obtained by converting an analog signal into a digital signal, the analog signal being generated from a pixel located on a corresponding one of the second unit columns out of the plurality of pixels;
   a second read bit line; and
   a plurality of third driver circuits, each of which is provided so as to correspond to a different one of the plurality of second unit columns and outputs the second pixel data to the second read bit line, the second pixel data being held in a corresponding one of the third latch circuits, wherein the second driver circuit outputs the first data to the second read bit line.

3. The solid-state imaging device according to claim 2, comprising:

a second amplifier that amplifies a voltage of the second read bit line to generate second data; and an output driver that outputs the second data, wherein the column scanning circuit sequentially outputs a plurality of the second pixel data corresponding to the plurality of second unit columns to the second amplifier by sequentially selecting the plurality of third driver circuits.

4. The solid-state imaging device according to claim 3, wherein the column scanning circuit sequentially outputs the first pixel data to the second amplifier.

5. The solid-state imaging device according to claim 1, wherein the first amplifier is activated only in a cycle in which any one of the plurality of first driver circuits is activated.

6. The solid-state imaging device according to claim 2, wherein the second latch circuit is further provided so as to correspond to a third unit column, and holds third pixel data obtained by converting an analog signal into a digital signal, the analog signal being generated from a pixel located on the third unit column out of the plurality of pixels, the second driver circuit outputs the third pixel data held in the second latch circuit to the second read bit line, and the column scanning circuit sequentially outputs a plurality of the second pixel data and the third pixel data corresponding to the plurality of second unit columns and the third unit column to the second amplifier through the second read bit line by sequentially selecting the plurality of third driver circuits and the second driver circuit.

7. The solid-state imaging device according to claim 2, comprising m (m is an integer equal to or larger than two) segments associated with different unit column groups, wherein each of the m segments includes the plurality of third latch circuits, the plurality of third driver circuits, the second read bit line, the second latch circuit, the second driver circuit, and the second amplifier, the second latch circuit included in a (j−1)-th (j is an arbitrary integer from two to m) segment of the m segments holds the second data generated by the second amplifier included in a j-th segment of the m segments, the second latch circuit included in a m-th segment of the m segments holds the first data generated by the first amplifier, the output driver outputs the second data generated by the second amplifier included in a 1st segment of the m segments, and the column scanning circuit (1) sequentially outputs the plurality of second pixel data corresponding to a 1st unit column group of the unit column groups to the second amplifier included in the 1st segment through the second read bit line included in the 1st segment by sequentially selecting the plurality of third driver circuits included in the 1st segment, (2) sequentially outputs the plurality of second pixel data corresponding to a j-th unit column group of the unit column groups to the second amplifier included in the 1st segment through a plurality of the second read bit lines included in segments from the j-th segment to the 1st segment by sequentially selecting the plurality of third driver circuits included in the j-th segment and selecting the second driver circuits included in segments from the 1st segment to the (j−1)-th segment, and (3) sequentially outputs a plurality of the first pixel data corresponding to the plurality of first unit columns to the second amplifier included in the 1st segment through the first read bit line and a plurality of the second read bit lines included in segments from the m-th segment to the 1st segment by sequentially selecting the plurality of first driver circuits and selecting a plurality of the second driver circuits included in segments from the 1st segment to the m-th segment.

8. The solid-state imaging device according to claim 7, wherein the second amplifier included in the j-th segment is activated only in a cycle in which any one of the plurality of third driver circuits and the second driver circuit included in the j-th segment is activated, and the first amplifier is activated only in a cycle in which any one of the plurality of first driver circuits is activated.

9. The solid-state imaging device according to claim 7, wherein the second latch circuit included in each segment is further provided so as to correspond to a third unit column included in a corresponding one of the unit column groups, and holds third pixel data obtained by converting an analog signal into a digital signal, the analog signal being generated from a pixel located on the third unit column out of the plurality of pixels;

the second driver circuit outputs the third pixel data held in the second latch circuit to the second read bit line; and the column scanning circuit (1) sequentially outputs the plurality of second pixel data corresponding to the 1st unit column group to the second amplifier included in the 1st segment through the second read bit line included in the 1st segment by sequentially selecting the plurality of third driver circuits and the second driver circuit included in the 1st segment, and (2) sequentially outputs the plurality of second pixel data corresponding to the j-th unit column group to the second amplifier included in the 1st segment through a plurality of the second read bit lines included in segments from the j-th segment to the 1st segment by sequentially selecting the plurality of third driver circuits and the second driver circuit included in the j-th segment and selecting the second driver circuits included in segments from the 1st segment to the (j−1)-th segment.

10. The solid-state imaging device according to claim 2, wherein the column scanning circuit sequentially outputs the plurality of second pixel data and the plurality of first pixel data to the second amplifier in order from the pixel data of a unit column closer to the output driver to the pixel data of a unit column away from the output driver by sequentially selecting the plurality of third driver circuits and the plurality of first driver circuits in a forward direction, and the solid-state imaging device further comprises an inversion column scanning circuit that sequentially outputs the plurality of second pixel data and the plurality of first pixel data to the second amplifier in order from the pixel data of a unit column away from the output driver to the pixel data of a unit column closer to the output driver by sequentially selecting the plurality of third driver circuits and the plurality of first driver circuits in an opposite direction to the forward direction.

11. The solid-state imaging device according to claim 2, wherein the plurality of third driver circuits, the plurality of first driver circuits, and the second driver circuit are disposed at a pitch equal to a pitch of the first unit columns and a pitch of the second unit columns, and the first amplifier is disposed in a region between a region where the plurality of third driver circuits are disposed and a region where the plurality of first driver circuits are disposed.

12. The solid-state imaging device according to claim 2, comprising:

a first circuit group; and a second circuit group, wherein each of the first circuit group and the second circuit group includes the plurality of third latch circuits, the plurality of third driver circuits, the second read bit line, the second amplifier, the plurality of first latch circuits, the first read bit line, the plurality of first driver circuits, the first amplifier, the second latch circuit, and the second driver circuit, the plurality of second unit columns and first unit columns corresponding to the first circuit group are a plurality of fourth unit columns disposed at an interval of N (N is an integer equal to or larger than two) unit columns, the plurality of second unit columns and first unit columns corresponding to the second circuit group are fifth unit columns which are disposed at the interval of the N unit columns, the fifth unit columns being different from the plurality of fourth unit columns, the first circuit group and the second circuit group are aligned in a direction orthogonal to an arrangement direction of columns, and in each of the first circuit group and the second circuit group, (1) the plurality of third driver circuits, the plurality of first driver circuits, and the second driver circuit are disposed at a pitch N times the pitch of unit columns, and (2) the first amplifier is disposed in a region between a region where the plurality of third driver circuits are disposed and a region where the plurality of first driver circuits are disposed.

13. The solid-state imaging device according to claim 11, further comprising:

one or more first precharge circuits that are connected to the second read bit line and disposed between two adjacent ones of the third driver circuits or between the third driver circuit and the second driver circuit which are adjacent to each other; and one or more second precharge circuits that are connected to the first read bit line and disposed between two adjacent ones of the first driver circuits or between the first driver circuit and the second driver circuit which are adjacent to each other.

* * * * *